US012137738B2

(12) United States Patent
Lee et al.

(10) Patent No.: US 12,137,738 B2
(45) Date of Patent: Nov. 12, 2024

(54) AEROSOL GENERATING DEVICE WITH MOVABLY COUPLED CARTRIDGES

(71) Applicant: KT&G CORPORATION, Daejeon (KR)

(72) Inventors: Won Kyeong Lee, Gyeonggi-do (KR); Min Kyu Kim, Seoul (KR); Jong Sub Lee, Gyeonggi-do (KR); Byung Sung Cho, Gyeonggi-do (KR)

(73) Assignee: KT&G CORPORATION, Daejeon (KR)

( * ) Notice: Subject to any disclaimer, the term of this patent is extended or adjusted under 35 U.S.C. 154(b) by 413 days.

(21) Appl. No.: 17/617,097

(22) PCT Filed: Jul. 2, 2021

(86) PCT No.: PCT/KR2021/008457
§ 371 (c)(1),
(2) Date: Dec. 7, 2021

(87) PCT Pub. No.: WO2022/010196
PCT Pub. Date: Jan. 13, 2022

(65) Prior Publication Data

US 2023/0189882 A1 Jun. 22, 2023

(30) Foreign Application Priority Data

Jul. 6, 2020 (KR) ........................ 10-2020-0083043

(51) Int. Cl.
*A24F 40/42* (2020.01)
*A24F 40/10* (2020.01)
(Continued)

(52) U.S. Cl.
CPC .............. *A24F 40/42* (2020.01); *A24F 40/10* (2020.01); *A24F 40/20* (2020.01); *A24F 40/30* (2020.01); *A24F 40/485* (2020.01); *H01F 7/02* (2013.01)

(58) Field of Classification Search
CPC ....................................................... A24F 40/42
See application file for complete search history.

(56) References Cited

U.S. PATENT DOCUMENTS 9,888,714 B2 * 2/2018 Cameron ................ A24F 40/60
10,856,579 B2 * 12/2020 Reevell .................. A24F 40/40
(Continued)

FOREIGN PATENT DOCUMENTS

CN 106231929 A 12/2016
CN 109982588 A 7/2019
(Continued)

OTHER PUBLICATIONS

Office Action dated Apr. 10, 2023 from the Chinese Patent Office in Application No. 202180004222.9.
(Continued)

*Primary Examiner* — Neil Abrams
(74) *Attorney, Agent, or Firm* — Sughrue Mion, PLLC

(57) ABSTRACT

An aerosol generating device includes a first cartridge configured to accommodate a first smokable material and comprising a delivery hole through which an aerosol generated from the first smokable material is delivered; a second cartridge comprising a plurality of chambers for accommodating a second smokable material through which the aerosol delivered from the first cartridge passes, and movably coupled to the first cartridge such that a position of the second cartridge with respect to the first cartridge is changeable; a magnetic body arranged in one of the second cartridge and the first cartridge; and an electromagnet arranged
(Continued)

in the other of the second cartridge and the first cartridge to face the magnetic body, and configured to generate magnetism toward the magnetic body such that one of the plurality of chambers is aligned with the delivery hole to form a flow path to a mouthpiece.

16 Claims, 16 Drawing Sheets

(51) Int. Cl.

| | |
|---|---|
| ***A24F 40/20*** | (2020.01) |
| ***A24F 40/30*** | (2020.01) |
| ***A24F 40/485*** | (2020.01) |
| ***H01F 7/02*** | (2006.01) |

(56) References Cited

U.S. PATENT DOCUMENTS

| | | | | |
|---|---|---|---|---|
| 10,993,477 | B2 | 5/2021 | Yamada et al. | |
| 11,018,536 | B2 | 5/2021 | Igwemezie | |
| 11,400,240 | B2 * | 8/2022 | Reevell | A24F 40/40 |
| 11,559,085 | B2 * | 1/2023 | Fujinaga | A24F 40/60 |
| 2008/0092912 | A1 | 4/2008 | Robinson et al. | |
| 2015/0020831 | A1 | 1/2015 | Weigensberg et al. | |
| 2015/0257451 | A1 * | 9/2015 | Brannon | A24F 40/30 131/328 |
| 2016/0235121 | A1 | 8/2016 | Rogan et al. | |
| 2018/0007965 | A1 | 1/2018 | Karles | |
| 2018/0168231 | A1 | 6/2018 | Reevell | |
| 2018/0338531 | A1 * | 11/2018 | Reevell | A24F 40/40 |
| 2020/0214355 | A1 | 7/2020 | Lee et al. | |
| 2021/0045438 | A1 | 2/2021 | Reevell | |
| 2021/0059306 | A1 | 3/2021 | Chen et al. | |
| 2021/0244098 | A1 | 8/2021 | Watson et al. | |
| 2022/0354169 | A1 * | 11/2022 | Cho | A24F 40/40 |
| 2022/0369703 | A1 * | 11/2022 | Kim | A24F 40/40 |
| 2023/0189882 | A1 * | 6/2023 | Lee | A24F 40/40 131/329 |
| 2023/0354890 | A1 * | 11/2023 | Lee | A24F 40/30 |
| 2024/0065317 | A1 * | 2/2024 | Schatz | A24F 40/42 |

FOREIGN PATENT DOCUMENTS

| | | | |
|---|---|---|---|
| CN | 110403241 | A | 11/2019 |
| CN | 110507004 | A | 11/2019 |
| EP | 2 989 912 | A1 | 3/2016 |
| KR | 10-2018-0135046 | A | 12/2018 |
| KR | 10-2019-0042014 | A | 4/2019 |
| KR | 10-2019-0051789 | A | 5/2019 |
| KR | 10-2019-0071787 | A | 6/2019 |
| KR | 10-2019-0089886 | A | 7/2019 |
| KR | 10-2019593 | B1 | 9/2019 |
| KR | 10-2020-0005939 | A | 1/2020 |
| WO | 2013/093695 | A1 | 6/2013 |
| WO | 2015/052192 | A1 | 4/2015 |
| WO | 2019/206334 | A1 | 10/2019 |

OTHER PUBLICATIONS

Office Action dated Mar. 10, 2022, issued in Korean Application No. 10-2020-0083043.

Extended European Search Report dated May 11, 2022, issued in European Application No. 21809897.8.

International Search Report of PCT/KR2021/008457 dated Oct. 19, 2021 [PCT/ISA/210].

Written Opinion of PCT/KR2021/008457 dated Oct. 19, 2021 [PCT/ISA/237].

* cited by examiner

AEROSOL GENERATING DEVICE WITH MOVABLY COUPLED CARTRIDGES

CROSS REFERENCE TO RELATED APPLICATIONS

This application is a National Stage of International Application No. PCT/KR2021/008457 filed on Jul. 2, 2021, claiming priority based on Korean Patent Application No. 10-2020-0083043 filed on Jul. 6, 2020.

TECHNICAL FIELD

One or more embodiments of the present disclosure relate to an aerosol generating device, and more particularly, to an aerosol generating device, whereby the relative position of a second cartridge with respect to a first cartridge may be adjusted and thus it is convenient to carry and use the aerosol generating device.

BACKGROUND ART

Recently, there is growing demand for an aerosol generating device that generates aerosols using non-combustion method, rather than by combusting cigarettes. For example, an aerosol generating device may be a device delivering aerosol to a user by generating aerosol with a non-combustion method or a device delivering fragrant aerosol by generating aerosol from aerosol generating material and passing the aerosol through a flavor medium.

DISCLOSURE OF INVENTION

Technical Problem

There is a demand for an aerosol generating device that can be easily used and carried and capable of generating an aerosol of good quality.

Solution to Problem

One or more embodiments of the present disclosure provide an aerosol generating device that may solve the above described problems.

One or more embodiments of the present disclosure provide an aerosol generating device that may be easily used and carried. One or more embodiments also provide an aerosol generating device that may generate an aerosol of good quality, thereby satisfying various needs of consumers.

Technical goals to be achieved by embodiments of the present disclosure are not limited to the above-described goals, and goals that are not mentioned will be clearly understood by one of ordinary skill in the art from the present specification and the accompanying drawings.

An aerosol generating device according to an embodiment may include a first cartridge configured to accommodate a first material and comprising a delivery hole through which an aerosol generated from the first material is delivered; a second cartridge comprising a plurality of chambers for accommodating a second material through which the aerosol delivered from the first cartridge passes, and movably coupled to the first cartridge such that a position of the second cartridge with respect to the first cartridge is changeable; a magnetic body arranged in one of the second cartridge and the first cartridge; and an electromagnet arranged in the other of the second cartridge and the first cartridge to face the magnetic body, and configured to generate magnetism toward the magnetic body such that the one of the first cartridge and the second cartridge moves with respect to the other.

Advantageous Effects of Invention

An aerosol generating device according to the above-described embodiment may be easily carried and used because a first cartridge accommodating a first material and a second cartridge accommodating a second material may be handled as one integrated device.

In addition, since the chambers of the second cartridge may include different types of second materials, the user may select a desired second material by selecting one of the chambers. Accordingly, the user may freely enjoy an aerosol having various flavors.

In addition, since the relative positions of the first cartridge and the second cartridge may be adjusted by using a magnetic body and an electromagnet, reliable and stable control of the aerosol generating device may be performed.

In addition, even when the first cartridge of the aerosol generating device is designed to accommodate a large amount of first material, the chamber for supplying the aerosol may be changed by changing the relative positions of the first cartridge and the second cartridge by using the electromagnet. Accordingly, a new second material may be loaded without replacing the second cartridge including the second material.

BEST MODE FOR CARRYING OUT THE INVENTION

Figure 1:
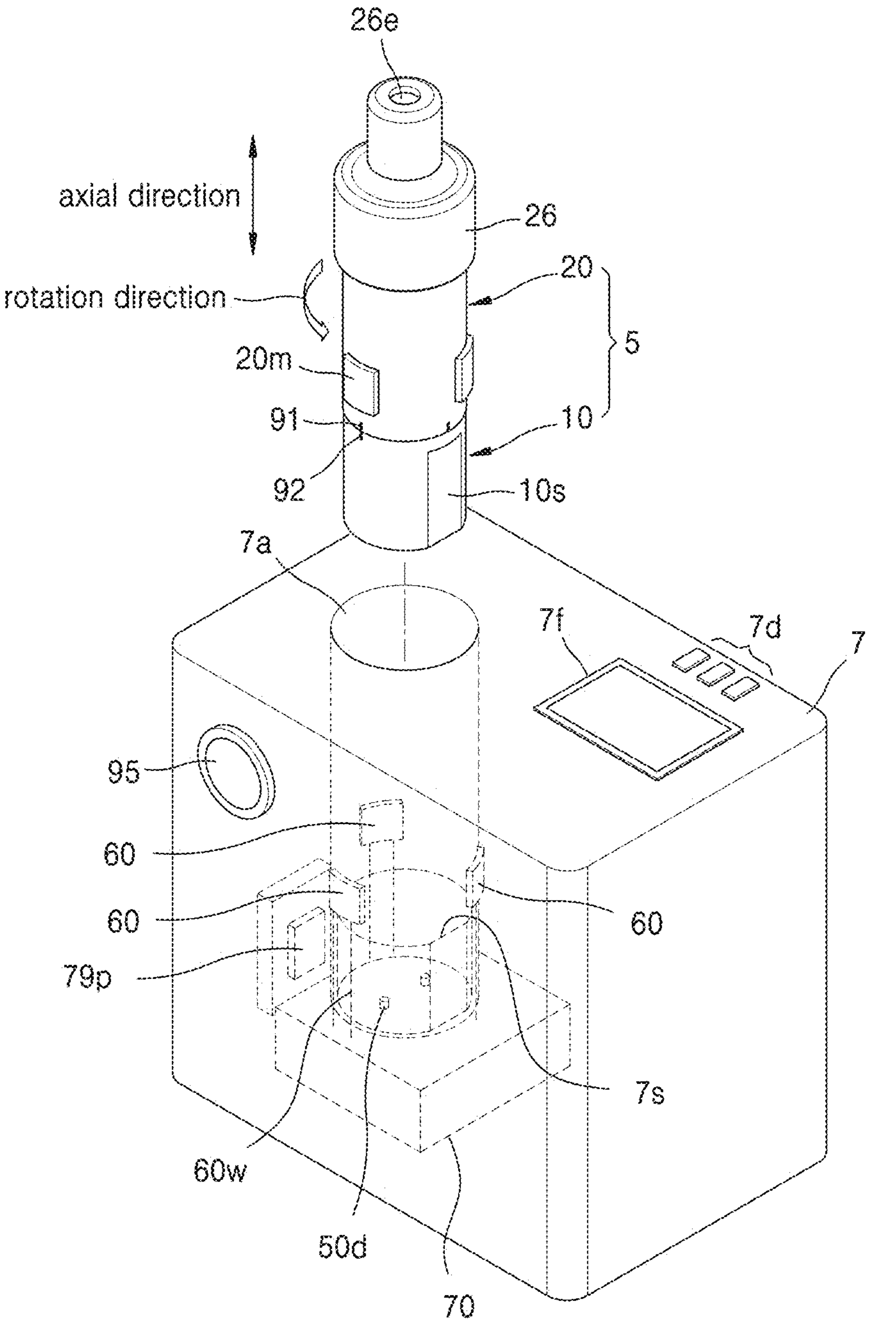
FIG. 1 is a perspective view of an aerosol generating device according to an embodiment.

An aerosol generating device according to one or more embodiments includes a first cartridge configured to accommodate a first material and comprising a delivery hole through which an aerosol generated from the first material is delivered; a second cartridge comprising a plurality of chambers for accommodating a second material through which the aerosol delivered from the first cartridge passes, and movably coupled to the first cartridge such that a position of the second cartridge with respect to the first cartridge is changeable; a magnetic body arranged in one of the second cartridge and the first cartridge; and an electromagnet arranged in the other of the second cartridge and the first cartridge to face the magnetic body, and configured to generate magnetism toward the magnetic body such that the one of the first cartridge and the second cartridge moves with respect to the other.

The electromagnet may exert a repulsive force on the magnetic body such that the position of the second cartridge with respect to the first cartridge is changed.

The electromagnet may exert an attractive force on the magnetic body such that movement of the one of the first cartridge and the second cartridge stops when at least one of the chambers is aligned with the delivery hole.

The aerosol generating device may further include a position maintenance magnetic body configured to pull the magnetic body to maintain the position of the second cartridge with respect to the first cartridge.

A magnitude of the repulsive force acting on the magnetic body is greater than a magnitude of the attractive force acting on the magnetic body such that the position of the second cartridge with respect to the first cartridge is changed.

A plurality of electromagnets may be arranged on a movement path of the one of the first cartridge and the second cartridge, wherein at least one of the plurality of electromagnets is configured to push the magnetic body to change the position of the second cartridge with respect to the first cartridge, and at least one of the plurality of electromagnets may be configured to pull the magnetic body to maintain the position of the second cartridge with respect to the first cartridge.

The first cartridge may include a plurality of reservoirs for accommodating the first material, wherein each of the plurality of reservoirs may include the delivery hole, and the electromagnet is configured to change the position of the second cartridge with respect to the first cartridge such that at least one of the chambers is aligned with the delivery hole of one of the reservoirs.

Any one of the first cartridge and the second cartridge in which the magnetic body is arranged, may be rotatably coupled to the other one of the first cartridge and the second cartridge.

A plurality of electromagnets may be arranged in the one of the first cartridge and the second cartridge in a rotation direction, and polarities of the plurality of electromagnets may be sequentially reversed such that the one of the first cartridge and the second cartridge rotates in the rotation direction.

The aerosol generating device may further include a rotation shaft connected to the one of the first cartridge and the second cartridge such that the rotation shaft rotates along with the one of the first cartridge and the second cartridge; and an one-way clutch coupled to the rotation shaft and configured to allow rotation of the rotation shaft in one direction and limit rotation of the rotation shaft in an opposite direction.

Any one of the first cartridge and the second cartridge in which the magnetic body is arranged may be is configured to move linearly with respect to the other one of the first cartridge and the second cartridge.

A plurality of electromagnets may be arranged in the one of the first cartridge and the second cartridge along a linear path, and the plurality of electromagnets may be configured to reverse polarities sequentially such that the one of the first cartridge and the second cartridge moves along the linear path.

The aerosol generating device may further include a movement limiter configured to limit movement of the one of the first cartridge and the second cartridge to one direction.

The position of the second cartridge with respect to the first cartridge may be changed so that the position of any one of the chambers is aligned with the delivery hole or adjacent chambers among the chambers simultaneously overlap the delivery hole.

The aerosol generating device may further include a solenoid switch configured to limit change of the position of the second cartridge with respect to the first cartridge by contacting the one of the first cartridge and the second cartridge when inactivated, and allow the change of the position of the second cartridge with respect to the first cartridge by releasing contact with the one of the first cartridge and the second cartridge when deactivated.

The aerosol generating device may further include a magnetism sensor configured to detect magnetism of the magnetic body.

MODE FOR THE INVENTION

With respect to the terms used to describe the various embodiments of the present disclosure, general terms which are currently and widely used are selected in consideration of functions of structural elements in the various embodiments of the present disclosure. However, the meaning of the terms can be provided according to intention, a judicial precedence, the appearance of a new technology, and the like. In addition, in certain cases, a term which is not commonly used can be selected. In such a case, the meaning of the term will be described in detail at the corresponding portion in the description of the present disclosure. Therefore, the terms used to describe the various embodiments of the present disclosure should be defined based on the meaning of the terms and the descriptions provided herein.

In addition, unless explicitly described to the contrary, the word “comprise” and variations such as “comprises” or “comprising” will be understood to imply the inclusion of stated elements but not the exclusion of any other elements. In addition, the terms “-er”, “-or”, and “module” described in the specification mean units for processing at least one function and/or operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

If one component or layer is mentioned to be "over," "above," "connected to," or "combined with" another component or layer, the one component or layer is arranged to be over, above, connected to, or combined with the other component or layer with or without an intervening component(s) or layer(s). In contrast, if one component or layer is mentioned to be "directly over," "directly above," "directly connected to," or "directly combined with" another component or layer, there is no additional components or layers between the components or layers. In the disclosure, the same reference numbers may indicate the same components.

Hereinafter, embodiments of the present disclosure will be described more fully with reference to the accompanying drawings, in which non-limiting example embodiments of the present disclosure are shown such that one of ordinary skill in the art may easily work the present disclosure. Embodiments of the present disclosure may, however, be embodied in many different forms and should not be construed as being limited to the example embodiments set forth herein.

Figure 2:
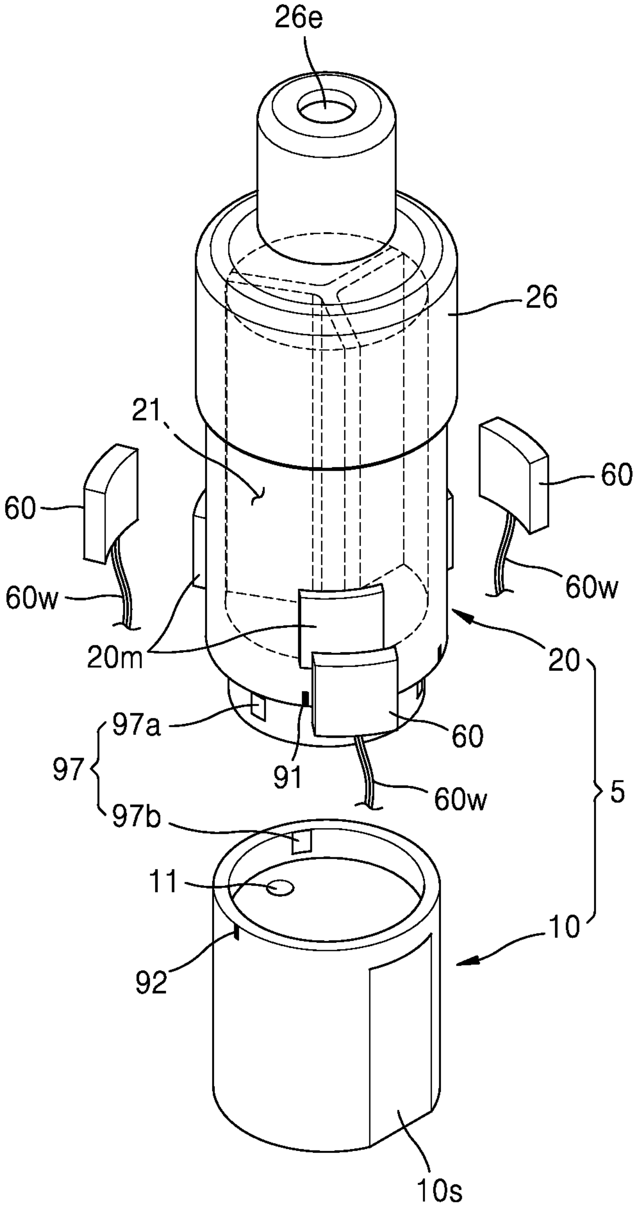
FIG. 2 is a perspective view illustrating a separated state of some components of the aerosol generating device shown in FIG. 1.
Figure 3:
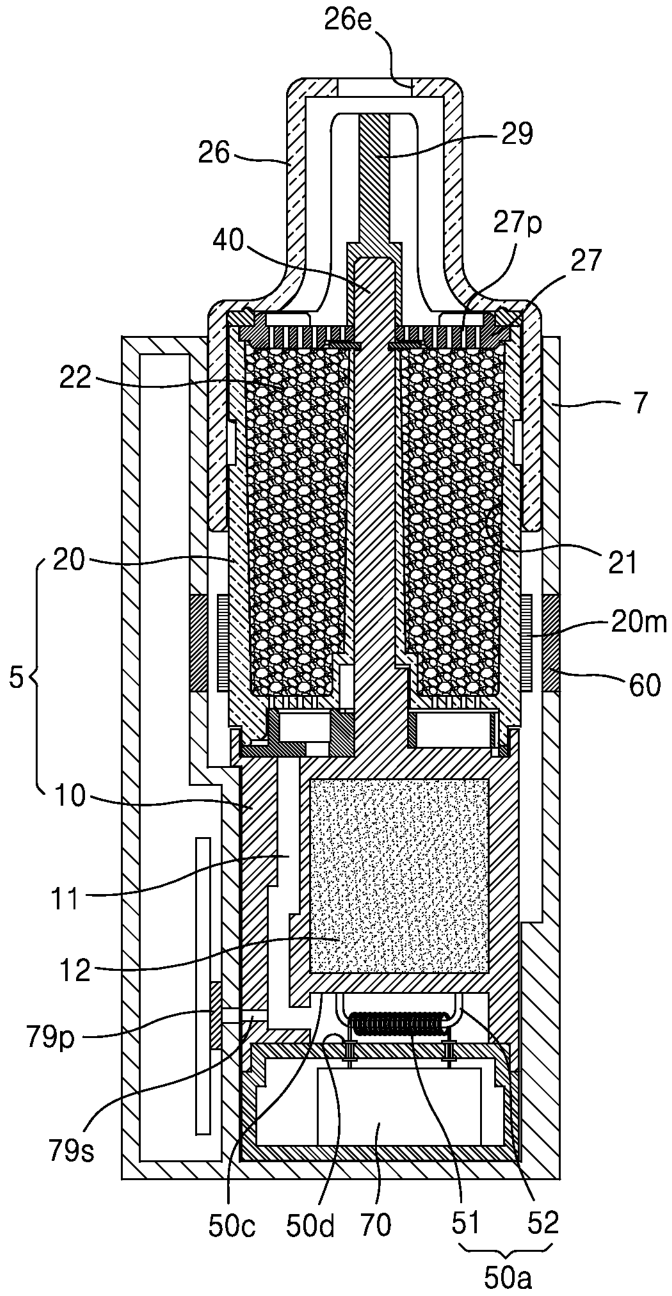
FIG. 3 is a longitudinal cross-sectional view illustrating the aerosol generating device shown in FIG. 1.

FIG. 1 is a perspective view of an aerosol generating device according to an embodiment, FIG. 2 is a perspective view illustrating a separated state of some components of the aerosol generating device shown in FIG. 1, and FIG. 3 is a longitudinal cross-sectional view illustrating the aerosol generating device shown in FIG. 1.

The aerosol generating device according to the embodiment shown in FIGS. 1 through 3 provides an aerosol. The aerosol generating device may heat an aerosol generating material by using a heater operating by using electricity, an induction magnetic field, or an ultrasonic wave, to generate an aerosol.

Referring to FIG. 3, the aerosol generating device may include a first cartridge 10 in which a first material 12 is accommodated and which includes a delivery hole 11 through which the aerosol generated from the first material 12 is delivered, a case 7 for supporting the first cartridge 10, a second cartridge 20 including a plurality of chambers 21 for accommodating a second material 22 through which the aerosol delivered from the first cartridge 10 passes and is discharged to the outside, and a magnetic body 20*m* and an electromagnet 60 for changing the position of the second cartridge 20.

The first cartridge 10 and the second cartridge 20 may be integrally coupled to each other and may form an aerosol generating assembly 5 so as to be handled as one integrated component.

Referring to FIG. 1, the aerosol generating device may include the case 7 including an accommodation passage 7*a* for accommodating the aerosol generating assembly 5. The case 7 may include, on an outer surface, a display device 7*f* for providing information to the user, and a display lamp 7*d* for providing a notification regarding an operating state of the aerosol generating device to the user. The display device 7*f* and the display lamp 7*d* may be examples of information generators for performing a function of notifying various types of notifications to the user, and the information generator may be changed to a form such as a speaker or a vibration generator.

Also, the case 7 may include an input device 95 that may be manipulated by the user and detects the user's manipulation to generate a user input signal.

In the embodiment shown in FIGS. 1 through 3, the case 7 may approximately have a rectangular shape, and the aerosol generating assembly 5 may have a cylindrical shape that extends long in an axial direction. However, embodiments are not limited by the shapes of the case 7 and the aerosol generating assembly 5. For example, the case 7 may be changed to have a different shape, such as a cylindrical shape extending long in the axial direction, a cylindrical shape with an elliptical cross-section, a flat cylindrical shape, a regular hexahedron shape, and a rectangular parallelepiped shape. Also, the aerosol generating assembly 5 may be changed to have a different shape, such as a rectangular parallelepiped shape, a regular hexahedron shape, and the like.

The first cartridge 10 and the second cartridge 20 may be coupled to each other in such a way that the relative positions of the first cartridge 10 and the second cartridge 20 with respect to each other may be changed. In the embodiment shown in FIGS. 1 through 3, the second cartridge 20 may be relatively rotated with respect to the first cartridge 10 so that the relative positions of the first cartridge 10 and the second cartridge 20 may be changed. The first cartridge 10 may have a cylindrical shape as a whole and include a position fixing surface 10*s*, which is at least partially formed differently from the extension direction of the cylindrical surface.

The accommodation passage 7*a* of the case 7 may be formed as a hollow cylindrical path that extends long to accommodate the aerosol generating assembly 5. A position maintenance surface 7*s* may be formed on at least a portion of the accommodation passage 7*a* to be different from the extension direction of the cylindrical surface of an inner wall of the accommodation passage 7*a* such that the position maintenance surface 7*s* has a shape corresponding to the position fixing surface 10*s* of the first cartridge 10.

When the aerosol generating assembly 5 is accommodated in the accommodation passage 7*a* of the case 7, the position maintenance surface 7*s* and the position fixing surface 10*s* are in contact with each other, and accordingly, the position of the first cartridge 10 with respect to the case 7 may be stably maintained. That is, when the second cartridge 20 is rotating with respect to the first cartridge 10, the positing fixing surface 10*s* of the first cartridge 10 is supported by the position maintenance surface 7*s* so that a state in which the first cartridge 10 does not rotate but is fixed to the case 7 may be stably maintained.

In addition, when the aerosol generating assembly 5 is inserted into the accommodation passage 7*a* of the case 7, the position maintenance surface 7*s* and the position fixing surface 10*s* may perform an alignment function of aligning the relative positions of an axial center of the aerosol generating assembly 5 with respect to an axial center of the accommodation passage 7*a*. That is, the position fixing surface 10*s* of the first cartridge 10 and the position maintenance surface 7*s* of the accommodation passage 7*a* of the aerosol generating assembly 5 need to correspond to each other so that the aerosol generating assembly 5 may be inserted into the accommodation passage 7*a* of the case 7.

The case 7 may include an electrical terminal 50*d* that is arranged at an end of the accommodation passage 7*a* and supplies electricity to the first cartridge 10. When the aerosol generating assembly 5 is aligned with respect to the accommodation passage 7*a* so that the position fixing surface 10*s* of the first cartridge 10 and the position maintenance surface 7*s* of the accommodation passage 7*a* of the aerosol generating assembly 5 correspond to each other, the electrical terminal 50*d* may be accurately connected to the first cartridge 10.

Embodiments of the present disclosure are not limited by the coupling structure of the first cartridge 10 and the second cartridge 20 described above, and the first cartridge 10 and the second cartridge 20 may be rotatably coupled to each other by using various coupling structures. For example, the first cartridge 10 may rotate with respect to the second cartridge 20 so that the relative positions of the first cartridge 10 and the second cartridge 20 may be adjusted. To this end, the second cartridge 20 may be maintained fixed to the case 7, and the first cartridge 10 may rotate with respect to the case 7 and the second cartridge 20.

Referring to FIG. 3, the first cartridge 10 may perform a function of delivering the aerosol generated in an atomizer 50*a* embedded in the case 7 to the second cartridge 20.

The first cartridge 10 may accommodate the first material 12. The first material 12 may be, for example, a liquid or gel material. The first material 12 may be maintained in a liquid state by being impregnated within a porous material such as a sponge or cotton wool inside the first cartridge 10.

The first material 12 may be a liquid material and may include, for example, a tobacco-containing material including volatile tobacco incense ingredients, or a nontobacco material.

The first material 12 may include, for example, water, a solvent, ethanol, a plant extract, spices, flavorings, or a vitamin mixture.

The spices of the first material 12 may include menthol, peppermint, spearmint oil, and various fruit-flavored ingredients, but are not limited thereto. The flavorings may include ingredients capable of providing various flavors or tastes to the user.

The vitamin mixture of the first material 12 may be a mixture of at least one of vitamin A, vitamin B, vitamin C, and vitamin E, but is not limited thereto.

Also, the first material 12 may include an aerosol forming agent such as glycerin and propylene glycol.

The atomizer 50*a* and a controller 70 that generate an aerosol by heating the first material 12 of the first cartridge 10 may be installed under the accommodation passage 7*a* inside the case 7. The controller 70 may include a battery for supplying power to the atomizer 50*a* and a control chip or a control circuit board for controlling the operation of the atomizer 50*a*.

The atomizer 50*a* may include a wick 52 that absorbs the first material 12 from the first cartridge 10 and holds the first material 12, a heater 51 that is wound around the wick 52 and is in contact with or adjacent to the wick 52 to heat the first material 12 and generate an aerosol, and an aerosol generating chamber 50*c* that surrounds the heater 51 and forms an atmosphere for generating an aerosol.

The atomizer 50*a* may perform a function of generating an aerosol by converting a phase of the aerosol generating material into a gaseous phase. The aerosol may refer to a gas in which vaporized particles generated from the aerosol generating material are mixed with air.

The heater 51 included in the atomizer 50*a* may be an electro-resistive heating body that generates heat by electricity supplied from the controller 70. However, embodiments of the present disclosure are not limited by such configuration of the atomizer 50*a*. For example, the atomizer 50*a* may generate an aerosol, for example, in an ultrasonic wave method or an induction heating method.

The first cartridge 10 may include the delivery hole 11 that extends along the extension direction (i.e., lengthwise direction) of the first cartridge 10 to deliver the aerosol. The aerosol generating chamber 50*c* may deliver the aerosol generated by the heater 51 to the delivery hole 11 of the first cartridge 10. Thus, the aerosol supplied from the aerosol generating chamber 50*c* may be delivered to the second cartridge 20 via the delivery hole 11 of the first cartridge 10.

The second cartridge 20 may rotate with respect to the first cartridge 10. Also, the second cartridge 20 may include a plurality of chambers 21, which are sequentially positioned along a rotation direction of the second cartridge 20, and a second material 22, which is accommodated in each of the plurality of chambers 21 such that the aerosol passes through the second material 22.

The second material 22 may be in a solid state and may include, for example, powder or a granule that is a set of small-sized particles.

The second material 22 may include, for example, a tobacco-containing material including volatile tobacco incense ingredients, or may include additives, such as flavors, a wetting agent, and/or organic acid, or a flavored material such as menthol or a moisturizer, or any one ingredient of a plant extract, spices, flavorings, and a vitamin mixture, or a mixture of these ingredients.

The spices of the second material 22 may include menthol, peppermint, spearmint oil, and various fruit flavored ingredients, but are not limited thereto.

The flavorings of the second material 22 may include ingredients capable of providing various flavors or tastes to the user.

The vitamin mixture of the second material 22 may include a mixture of at least one of vitamin A, vitamin B, vitamin C, and vitamin E, but is not limited thereto.

The second cartridge 20 may include a plurality of chambers 21 that are apart from each other and sequentially arranged in the rotation direction of the second cartridge 20. The chambers 21 may be separated from one another by a barrier wall.

In FIG. 2, three chambers 21 are formed. However, embodiments are not limited by the number of chambers 21, and two or more chambers 21 may be formed.

Referring to FIG. 3, the first cartridge 10 may include a rotation shaft 40 that protrudes upward. The rotation shaft 40 may protrude from the first cartridge 10 and extend upward, and the second cartridge 20 may be rotatably coupled to the rotation shaft 40.

A mechanical element such as a bearing may be arranged between the second cartridge 20 and the rotation shaft 40 to enable free rotation of the second cartridge 20. In the case of using a bearing, when the repulsive force or attractive force of an electromagnet 60 is exerted on the magnetic body 20*m*, the second cartridge 20 may smoothly start a rotational motion without receiving mechanical resistance.

The second cartridge 20 that has started the rotational motion may make a rotational motion within a certain angular range until external force for stopping the second cartridge 20 is applied to the second cartridge 20. Also, the second cartridge 20 may repeat the rotational motion around the rotation shaft 40 until external force is applied to the second cartridge 20.

A mouthpiece 26 including an outlet 26*e* for discharging the aerosol passing through the second material 22 of at least one of the chambers 21 to the outside may be coupled to the upper portion of the second cartridge 20. An upper plate 27 may be arranged above the chambers 21 to cover upper ends of the chambers 21. The upper plate 27 may include an upper through hole 27*p* through which the aerosol passes.

A flow guide 29 may be coupled to the upper end of the rotation shaft 40 that protrudes from the top surface of the upper plate 27. The flow guide 29 may be arranged inside the mouthpiece 26 and may perform a function of guiding the flow of the aerosol passing through the second material 22 of the chambers 21 to the outlet 26*e* of the mouthpiece 26. The flow guide 29 may include a plurality of wings respectively corresponding to the chambers 21.

In a state in which the first cartridge 10 and the second cartridge 20 are coupled to each other, the relative positions of the first cartridge 10 and the second cartridge 20 may be changed so that at least one of the plurality of chambers 21 of the second cartridge 20 is aligned with the delivery hole 11 of the first cartridge 10. Thus, the aerosol discharged from the delivery hole 11 of the first cartridge 10 may pass through the second material 22 accommodated in the aligned chamber aligned with the delivery hole 11, among the plurality of chambers 21 of the second cartridge 20. While the aerosol passes through the second material 22, the characteristics of the aerosol may be changed.

The aerosol generating device may include the electromagnet 60 that generates a driving force to move the second cartridge 20 with respect to the first cartridge 10 and the case 7. To this end, the magnetic body 20*m* may be arranged in the second cartridge 20. Referring to FIGS. 1 and 3, the electromagnet 60 may be arranged inside the case 7 and may operate by an electrical signal applied from the outside to generate magnetism. Because the electromagnet 60 is electrically connected to the controller 70 via a wire 60*w*, the electrical signal of the controller 70 may be applied to the electromagnet 60.

A plurality of magnetic bodies 20*m* may be arranged on an outer surface of the second cartridge 20 along the rotation direction of the second cartridge 20. The plurality of magnetic bodies 20*m* may include a permanent magnet magnetized toward a certain direction. The magnetic bodies 20*m* may be, for example, magnetized so that a surface facing the second cartridge 20 of the magnetic body 20*m* becomes an S-pole and the opposite surface becomes an N-pole, or vice versa.

When the aerosol generating assembly 5 is mounted on the case 7, the positions of the magnetic bodies 20*m* arranged in the second cartridge 20 and the position of the electromagnet 60 arranged in the case 7 may correspond to each other. The electromagnet 60 may generate magnetism toward the magnetic bodies 20*m*, thereby performing a function of changing the position of the second cartridge 20. That is, when an electrical signal is applied to the electromagnet 60, the electromagnet 60 may be magnetized so that the magnetic pole of a surface facing the second cartridge 20 of the electromagnet 60 is the same as the magnetic pole of the outer surface of the magnetic body 20*m*, and the repulsive force may be exerted between the electromagnet 60 and the magnetic bodies 20*m*. Thus, the second cartridge 20 may start the rotational motion with respect to the first cartridge 10 by the repulsive force exerted between the electromagnet 60 and the magnetic bodies 20*m*.

Embodiments are not limited to the configuration of the electromagnet 60 and the magnetic bodies 20*m* shown in FIGS. 1 and 3, and for example, the arrangement positions and the number of electromagnets 60 and magnetic bodies 20*m* may be variously modified. That is, when the magnetic bodies 20*m* arranged along the circumferential direction (i.e., rotation direction) of the second cartridge 20, the number of magnetic bodies 20*m* may be two or four or more, and the number of electromagnets 60 may be further increased or decreased according to the number of magnetic bodies 20*m*. In addition, the magnetic bodies 20*m* may be arranged in the case 7, and the electromagnet 60 may be arranged in the second cartridge 20.

In addition, embodiments are not limited by a structure in which the electromagnet 60 and the magnetic bodies 20*m* are arranged at uniform intervals in the circumferential direction of the second cartridge 20. For example, a distance between the adjacent electromagnets 60 and/or a distance between the adjacent magnetic bodies 20*m* may not be consistent. That is, along the circumferential direction of the second cartridge 20, a distance between the adjacent electromagnets 60 in one region may be narrower than a distance between the adjacent electromagnets 60 in another region. In addition, the length of the electromagnet 60 and/or the magnetic body 20*m* extending in the circumferential direction of the second cartridge 20 (i.e., the length of an arc corresponding to a central angle at which an electromagnet and/or a magnetic body extends in the circumferential direction based on the center of the second cartridge 20) may be modified so that each of the plurality of electromagnets 60 and/or the magnetic bodies 20*m* is different from another.

Here, the position of at least one of the plurality of chambers 21 of the second cartridge 20 may correspond to the position of the delivery hole 11 of the first cartridge 10. That is, one or more chambers from among the plurality of chambers 21 may be aligned with the delivery hole 11 of the first cartridge 10 such that the aligned chamber(s) is/are in fluid communication with the delivery hole 11.

Referring to FIGS. 1 and 2, the second cartridge 20 may include a mark 91 arranged on an outer surface of the second cartridge 20. The second cartridge 20 may include a plurality of chambers 21 therein, and the mark 91 of the second cartridge 20 may be arranged at a position corresponding to each of the chambers 21.

The first cartridge 10 may include, on an outer surface on the first cartridge 10, a mark 92 that may be used as a reference position regarding the mark 91 of the second cartridge 20. When the mark 91 of the second cartridge 20 may coincides with the mark 92 of the first cartridge 10, the position of at least one of the chambers 21 may be aligned with the position of the delivery hole 11 of the first cartridge 10 such that the aerosol is discharged through the aligned chamber(s) (hereinafter "chamber in use").

Also, the user may check the positions of the mark 91 of the second cartridge 20 and the mark 92 of the first cartridge 10 to identify the chamber in use, among the chambers 21 of the second cartridge 20.

A position sensor 97 may be installed between the second cartridge 20 and the first cartridge 10. The position sensor 97 may identify the type of the second material 22 included in the chamber in use, according to the relative positions of the first cartridge 10 and the second cartridge 20. The position sensor 97 may perform a function of detecting the position of at least one of the chambers 21 with respect to the delivery hole 11, and generate a signal indicating the detected position.

The position sensor 97 may include a transmitter 97*a* that is arranged in the cartridge 20, and a receiver 97*b* that is arranged in the first cartridge 10 and detects the transmitter 97*a*. Embodiments are not limited by the arrangement positions or the number of transmitters 97*a* and receivers 97*b*. For example, the transmitters 97*a* may be arranged in the first cartridge 10, and the receiver 97*b* may be arranged in the second cartridge 20.

When the position of at least one of the chambers 21 is aligned to correspond to the delivery hole 11, the position sensor 97 may generate a different identification signal corresponding to the aligned chamber.

The transmitter 97*a* and the receiver 97*b* of the position sensor 97 may be implemented by one of, for example, an optical detection sensor such as a photocoupler, a magnetic sensor that detects magnetism by using the Hall effect, an electrical resistance sensor that detects changes in electrical resistance, and a switch that generates a signal by a physical contact, or a combination thereof.

Embodiments are not limited by the structure of the position sensor 97 described above including the transmitter 97*a* and the receiver 97*b*, and for example, the position sensor 97 may not include an additional transmitter but may also include only a magnetic sensor that detects magnetism of the magnetic body 20*m* or the electromagnet 60.

Referring to FIGS. 1 and 3, a puff sensor 79*p* may be arranged on a path along which the aerosol flows, inside the case 7. The puff sensor 79*p* may perform a function of detecting a flow of the aerosol generated according to the user's aerosol inhalation operation. The puff sensor 79*p* may be connected to the delivery hole 11 to detect, for example, a change in pressure or flow rate of fluid (i.e., aerosol mixed with air) flowing through the delivery hole 11, and generate a signal based on the detection. The puff sensor 79*p* may be arranged in a pressure detection hole 79*s* connected to the delivery hole 11.

When using the aerosol generating device described above, the aerosol delivered from the first cartridge 10 to the chambers 21 of the second cartridge 20 may pass through the second material 22 accommodated in the chambers 21. The second material 22 may provide flavors to the aerosol. The flavored aerosol that has passes through the second material 22 may pass through the upper through hole 27*p* of the upper plate 27 disposed at an upper portion of the chambers 21 and then may be discharged to the outside of the aerosol generating device through the mouthpiece 26.

When pre-set conditions are met, the controller 70 may operate the electromagnet 60 to perform a function of changing the relative positions of the first cartridge 10 and the second cartridge 20 so that the chamber in use is changed. That is, the second material 22 included in the chambers 21 of the second chamber 20 may have a pre-set usage time in relation to an operation of passing the aerosol, and when an actual usage time used to perform the operation of passing the aerosol through the second material 22 reaches the pre-set usage time, the positions of the chambers need to be changed such that the chamber in use is changed.

The controller 70 may change the relative position of the second cartridge 20 with respect to the first cartridge 10 to perform a function of selecting a different chamber(s) as the chamber in use.

Also, the controller 70 may perform a function of identifying the chamber in use, among the chambers 21, that is aligned to correspond to the position of the delivery hole 11 to be used to pass the aerosol, based on the signal of the position sensor 97. As aforementioned, the 'chamber in use' refers to at least one chamber among the chambers 21, which is aligned to correspond to the position of the delivery hole 11 and in use to perform a function of passing the aerosol.

As described above, the electromagnet 60 may generate magnetism toward the magnetic body 20*m*, thereby performing a function of changing the position of the second cartridge 20 with respect to the first cartridge 10. That is, when an electrical signal is applied to the electromagnet 60, the electromagnet 60 exerts a repulsive force against the magnetic body 20*m* such that the second cartridge 20 may start a rotational motion with respect to the first cartridge 10.

The electromagnet 60 may exert an attractive force with respect to the magnetic body 20*m*, thereby performing a function of stopping the second cartridge 20 which is rotating with respect to the first cartridge 10. That is, when the second cartridge 20 moves relative to the first cartridge 10 so as to change the positions of the chambers 21 based on the delivery hole 11, the electromagnet 60 may limit the movement of the second cartridge 20, so that at least one of the chambers 21 may be at a position corresponding to the delivery hole 11.

In order for the electromagnet 60 to exert an attractive force with respect to the magnetic body 20*m*, the magnetization direction of the electromagnet 60 is changed so that one surface of the electromagnet 60 facing the magnetic body 20*m* may have the same magnetic pole as the outer surface of the magnetic body 20*m*. In order for the electromagnet 60 to exert a repulsive force or an attractive force on the magnetic body 20*m*, the magnetization direction of the electromagnet 60 needs to be changed. For example, the direction of current applied to the electromagnet 60 may be changed, or the electromagnet 60 may be mechanically rotated, so that the magnetization direction may be changed.

Figure 4:
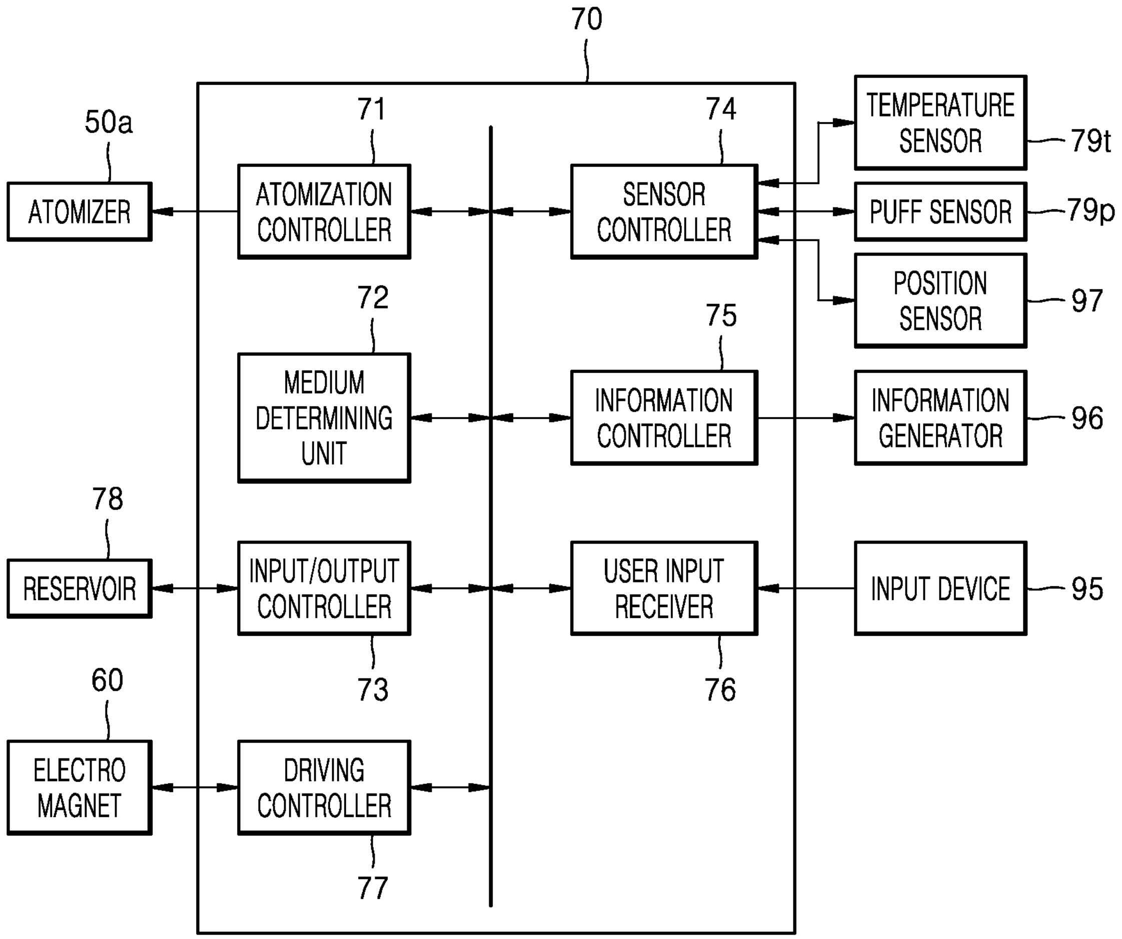
FIG. 4 is a block diagram schematically illustrating a connection relationship between some components of the aerosol generating device shown in FIG. 1.

FIG. 4 is a block diagram schematically illustrating a connection relationship between some components of the aerosol generating device shown in FIG. 1.

A controller 70 shown in FIG. 4 may be implemented by any one of a circuit board arranged inside the case 7 shown in FIGS. 1 and 3, a semiconductor chip attached to the circuit board, and software installed on the semiconductor chip or the circuit board, or a combination thereof.

The controller 70 may include an atomization controller 71 that controls the atomizer 50*a* to control the generation amount or the temperature of the aerosol, a temperature sensor 79*t* for detecting the temperature related to the atomizer 50*a*, a puff sensor 79*p* for detecting changes in pressure or speed of air which are caused when the user inhales the aerosol, the position sensor 97 (see also FIG. 2) that detects the rotation position of the second cartridge 20 with respect to the first cartridge 10, a sensor controller that receives sensing signals output from the temperature sensor 79*t*, the puff sensor 79*p*, and the position sensor 97. Also, the controller 70 may include an information controller 75 that controls an information generator 96 for providing information to the user or providing a notification, a user input receiver 76 that receives a user input signal from an input device 95 for receiving a user input via a button, a touch screen, user's motion, etc., an input/output controller 73 that exchanges data with a storage 78 storing information about the type of the first material of the first cartridge 10 or the second material of the second cartridge 20, a temperature profile for controlling the operating temperature of the atomizer 50*a*, information about the user, or information about the positions of the chambers 21 with respect to the delivery hole 11. The controller 70 may also include a medium determining unit 72 that determines a chamber in use and the type of a medium contained in the chamber in use based on the signal received from the position sensor 97, and a driving controller 77 for controlling the operation of the electromagnet 60.

The controller 70 described above may detect the user's inhalation action, and initiate or stop the operation of the atomizer 50*a*. Also, the controller 70 may determine the chamber in use and the type of the medium contained in the chamber in use based on the signal applied from the position sensor 97, and may control the operating temperature or operating time of the atomizer 50*a* to be suitable for the type of medium.

The controller 70 may determine the chamber in use and the type of the medium contained in the chamber in use based on the signal applied from the position sensor 97, and then may output information about the type of the chamber in use, e.g., a preset identification number of the chamber in use, to the information generator 96. The pre-set identification number of the chamber in use may include, for example, numbers, characters, or symbols. Also, the controller 70 may output information about the type of the medium contained in the chamber in use, for example, the name of the medium, the characteristics of the medium such as flavors or useful life, to the information generator 96.

The controller 70 may operate the electromagnet 60 when the pre-set conditions are satisfied. The pre-set conditions for changing the relative positions of the first cartridge 10 and the second cartridge 20 by operating the electromagnet 60 may be set based on a cumulative operating time of the heater or a combination of the cumulative operating time and the heating temperature of the heater.

When the pre-set conditions are met, the controller 70 may first generate a notification notifying that the relative positions of the first cartridge 10 and the second cartridge 20 need to be changed, through the information generator 96. Accordingly, the user may check the notification and manipulate the input device 95, such that the controller 70 may operate the electromagnet 60 based on the input signal to change the relative positions of the first cartridge 10 and the second cartridge 20.

When the pre-set conditions include the cumulative operating time of the heater, the controller 70 may calculate the amount of current or the amount of power supplied to the heater by using the atomizer controller 71 or may calculate the cumulative operating time of the heater by summing up the time periods during which the current is supplied to the heater. For example, if the useful time of the second material 22 included in the chamber in use is pre-set to n minutes, the controller 70 may determine, when the cumulative operating time of the heater reaches n minutes, that the chamber in use needs to be changed, and change the relative position of the second cartridge 20 with respect to the first cartridge 10. As such the aerosol may pass through a new chamber.

The heating operation of the heater may include a main heating operation of generating heat at a sufficient temperature to vaporize the first material of the first cartridge 10 and a pre-heating operation of generating heat in the range of temperature that is lower than temperature corresponding to the main heating operation. The main heating operation of the heater may only be considered to determine the cumulative operating time of the heater included in the pre-set conditions for operating the electromagnet 60. That is, the pre-heating operation of the heater may not be considered when determining the cumulative operating time of the heater included in the pre-set conditions for operating the electromagnet 60.

For example, in the case where the pre-set conditions include the combination of the cumulative operating time and the heating temperature of the heater, the controller 70 may count the cumulative operating time of the heater only when the heating temperature of the heater reaches the temperature corresponding to the main heating operation.

The pre-set conditions for changing the relative positions of the first cartridge 10 and the second cartridge 20 by operating the electromagnet 60 may include at least one of the number of puff actions determined based on the signal detected by the puff sensor 79*p* and the cumulative time of puff actions. When the intensity of the signal detected by the puff sensor 79*p* exceeds a pre-set threshold value, the controller 70 may determine that a valid inhalation operation has been performed by the user and may count the number of puff actions.

When the pre-set conditions include the number of puff actions, the controller 70 may count the number of puff actions performed on the chamber in use among the chambers 21 of the second cartridge 20, based on the signal generated by the puff sensor 79*p*. In this case, the controller 70 may count the number of puff actions that have occurred based on the signal of the puff sensor 79*p*, ignoring the cumulative time of puff actions.

For example, assume that useful life of the second material 22 included in one of the chambers 21 of the second cartridge 20 is pre-set to m times of puff actions. In this case, when the number of user's puff actions reaches m times, the controller 70 may change the relative positions of the second cartridge 20 with respect to the first cartridge 10 such that the aerosol passes through a new chamber.

The controller 70 may determine a position changing time of the second cartridge 20 for selecting a new chamber considering the use environment of the aerosol generating device or the user's inhalation habit. To this end, the pre-set conditions may include the cumulative time of puff actions or a combination of the number of puff actions and the cumulative time of puff actions.

The operation when the pre-set conditions include the combination of the number of puff actions and the cumulative time of puff actions may be as follows. For example, when the number of puff operations, in which the aerosol passes through the second material 22 included in one of the chambers 21 and flavors may be provided to the aerosol, is m times and the cumulative time of puff operations is pre-set to p minutes, the controller 70 may determine that the chamber in use needs to be changed, only when the number of puff actions reaches m times and also the cumulative time of puff actions reaches p minutes. Thus, even if the number of puff actions reaches m times based on the signal of the puff sensor 79*p*, if the cumulative time of puff actions has not reached p minutes, the controller 70 may not change the chamber in use until the cumulative time of puff actions reaches p minutes. In this case, the chamber in use may not be changed even after the number of puff actions exceeds m times.

Alternatively, according to another embodiment, the controller 70 may change the chamber in use when any one of the conditions is satisfied.

The pre-set condition for changing the relative positions of the first cartridge 10 and the second cartridge 20 may include a usage time that is determined based on an input signal generated when the input device 95 receives the user's input.

The pre-set condition including the usage time determined based on the input signal of the input device 95 may be more useful when the user may directly initiate the operation of the heater. For example, in order to suit the user's preference or improve convenience of the user, the aerosol generating device may provide a function in which the heater of the atomizer does not perform a separate pre-heating operation but the heater reacts immediately to the user's manipulation of the input device 95, thereby performing a main heating operation at a high speed. In this case, the pre-set condition includes the usage time determined based on the input signal of the input device 95, so that, when the usage time of the atomizer reaches a pre-set reference usage time by the user's manipulation, the controller 70 may change the relative positions of the second cartridge 20 with respect to the first cartridge 10 to change the chamber in use.

The pre-set condition for changing the relative positions of the first cartridge 10 and the second cartridge 20 may include at least one of the number of puff actions determined based on the signal detected by the puff sensor 79*b* and the cumulative time of puff actions. When the intensity of the signal detected by the puff sensor 79*p* exceeds a pre-set threshold value, the controller 70 may determine that a valid inhalation action has been performed by the user, and may count the number of puff actions.

In the above description, characters such as m, n, and p may denote integers or real numbers.

The pre-set condition for changing the relative positions of the first cartridge 10 and the second cartridge 20 by operating the electromagnet 60 with the controller 70 may include an input signal generated when the input device 95 receives the user's input to select at least one of the chambers 21 to be a chamber in use.

The chambers 21 of the second cartridge 20 may include the second material 22 having different types of mediums or different particle sizes, and the controller 70 may control the display lamp 7*d* to emit light or change an emission color, or display information on the display device 7*f*, thereby providing information, to the user, about the second material 22 included in the chamber in use.

When the user manipulates the input device 95 to select a desired chamber to be used from among the chambers 21, the controller 70 may determine that the condition is satisfied and change the relative positions of the first cartridge 10 and the second cartridge 20.

When using the aerosol generating device described above, the user may rotate the second cartridge 20 relative to the first cartridge 10 before mounting the aerosol generating assembly 5 on the case 7, thereby adjusting the rotation position of the second cartridge 20 so that the position of at least one of the chambers 21 of the second cartridge 20 coincides with a position corresponding to the delivery hole 11 of the first cartridge 10. After adjusting the relative positions of the first cartridge 10 and the second cartridge 20, the user may mount the aerosol generating assembly 5 on the case 7.

Alternatively, when the user mounts the aerosol generating assembly 5 on the case 7, the electromagnet 60 embedded in the case 7 may automatically rotate the second cartridge 20 such that the relative positions of the first cartridge 10 and the second cartridge 20 are moved to an initial position for generating an aerosol. The 'initial position' may refer to a position in which one of the chambers 21 of the second cartridge 20 corresponds to the position of the delivery hole 11.

In a state in which the position of at least one of the chambers 21 of the second cartridge 20 corresponds to the position of the delivery hole 11 of the first cartridge 10, the user may inhale the aerosol through the mouthpiece 26.

The aerosol generating assembly 5 of the aerosol generating device may be handled as a single device in which the first cartridge 10 for accommodating the first material 12 and the second cartridge 20 for accommodating the second material 22 are integrated with each other, and thus is convenient to carry and use.

In addition, even when the first cartridge 10 of the aerosol generating device is larger than the second cartridge 20, the second cartridge 20 may be automatically rotated by the electromagnet 60 to select another chamber from among the chambers 21. Accordingly, the user may change the second material 22 without replacing the second cartridge including the second material 22.

In addition, the chambers 21 of the second cartridge 20 may include different types of second materials 22. For example, the chambers 21 may include the second material 22 having different particle sizes or different flavors. Even when the chambers 21 include different types of second materials 22, the controller 70 may identify the chamber in use, among the chambers 21, based on a signal generated by the position sensor 97. Because information about the chamber in use identified by the controller 70 and on the second material 22 included in the chamber in use may be provided to the user, the user may select one of the chambers 21 to select a desired second material 22, and enjoy the aerosol having various flavors.

Figure 5:
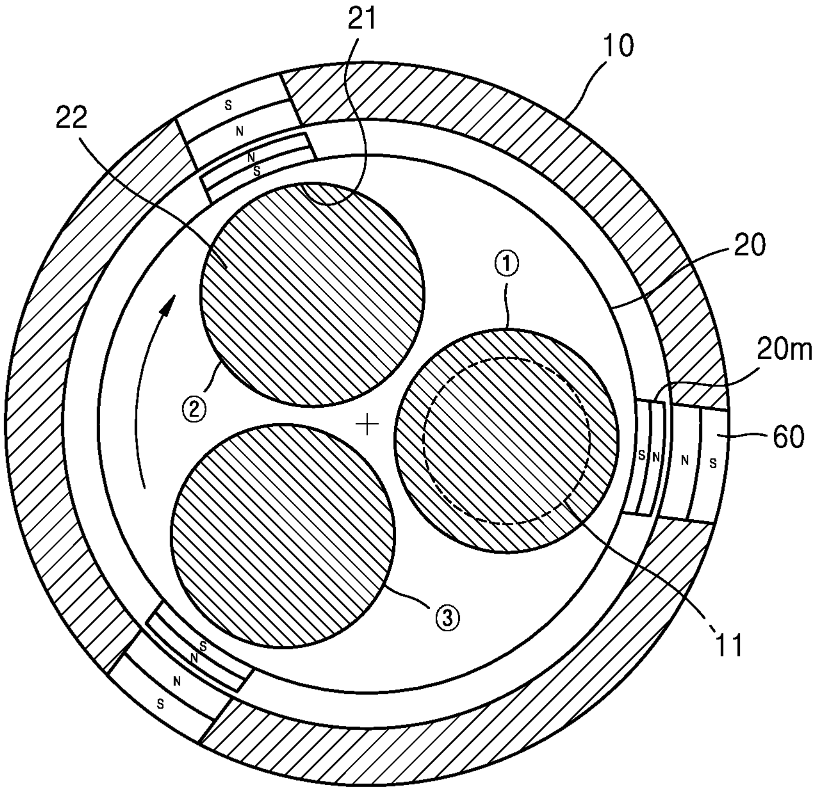
FIG. 5 is a cross-sectional view schematically illustrating one operating state of the aerosol generating device shown in FIG. 1.
Figure 6:
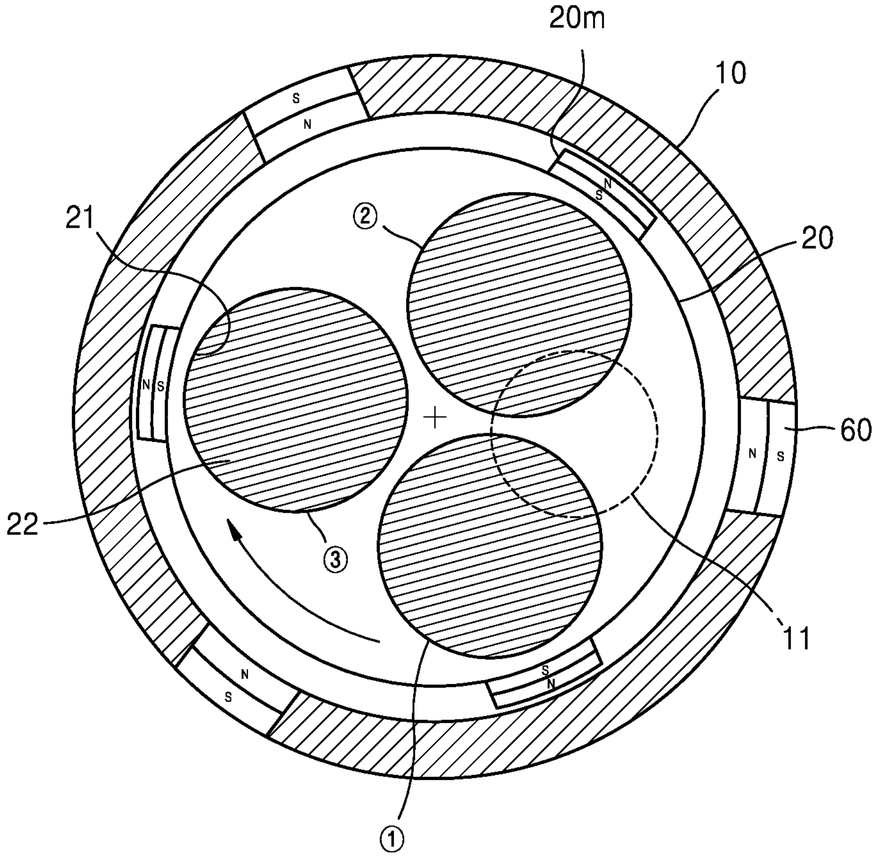
FIG. 6 is a cross-sectional view schematically illustrating another operating state of the aerosol generating device shown in FIG. 1.
Figure 7:
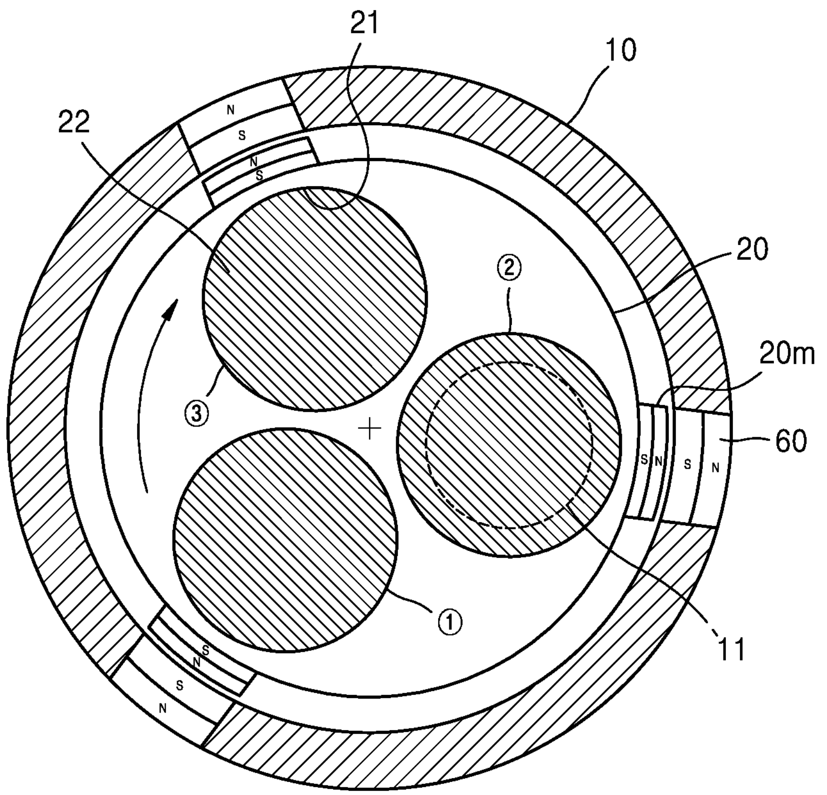
FIG. 7 is a cross-sectional view schematically illustrating another operating state of the aerosol generating device shown in FIG. 1.

FIG. 5 is a cross-sectional view schematically illustrating one operating state of the aerosol generating device shown in FIG. 1, FIG. 6 is a cross-sectional view schematically illustrating another operating state of the aerosol generating device shown in FIG. 1, and FIG. 7 is a cross-sectional view schematically illustrating another operating state of the aerosol generating device shown in FIG. 1.

In the aerosol generating device according to the embodiment shown in FIGS. 5 through 7, each of the chambers 21 may have a unique identification number of 1, 2, and 3. As the second cartridge 20 makes a rotational motion with respect to the first cartridge 10 maintained in a fixed position, one of the chambers 21 may perform a function of the chamber in use that is aligned with respect to the position of the delivery hole 11 of the first cartridge 10 and passes the aerosol.

A plurality of electromagnets 60 may be arranged on a movement path of the second cartridge 20. Here, the 'movement path' is not limitedly interpreted to mean only a physical path through which the second cartridge 20 passes, but may be interpreted to mean a region corresponding to a circumferential path along which the magnetic bodies 20*m* move as the second cartridge 20 rotates. In the aerosol generating device according to the embodiment shown in FIGS. 5 through 7, the electromagnet 60 is arranged in the first cartridge 10.

A plurality of magnetic bodies 20*m* may be arranged on the outer surface of the second cartridge 20 to be apart from each other in the circumferential direction of the second cartridge 20. The number of magnetic bodies 20*m* may correspond to the number of electromagnets 60, or the number of magnetic bodies 20*m* and the number of electromagnets 60 may be different from each other. For example, in FIGS. 5 through 6, three magnetic bodies 20*m* and three electromagnets 60 are each arranged, but embodiments are not limited thereto. For example, the number of magnetic bodies 20*m* may be greater or smaller than the number of electromagnets 60 so that the position of the second cartridge 20 may be precisely adjusted.

The embodiments are not limited by the arrangement positions of the electromagnets 60 and the magnetic bodies 20*m* described above, and for example, the electromagnets 60 may be arranged in the second cartridge 20, and the magnetic bodies 20*m* may be arranged in the first cartridge 10.

FIG. 5 illustrates that the chamber having the identification number of 1 is aligned with respect to the delivery hole 11. When the electromagnets 60 operates, sides of the electromagnets 60 and the magnetic bodies 20*m* facing each other have the same magnetic poles. Because a repulsive force exerts between the electromagnets 60 and the magnetic bodies 20*m*, the second cartridge 20 disposed to rotate with respect to the first cartridge 10 starts a rotational motion by the repulsive force exerted by the electromagnets 60. The direction of the rotational motion of the second cartridge 20 may be limited to only one direction. That is, in FIGS. 5 through 7, the direction of the rotational motion of the second cartridge 20 with respect to the first cartridge 10 is limited only to a clockwise direction.

In order to limit the direction of the rotational motion of the second cartridge 20, a mechanical element such as a one-way clutch, or a permanent magnet having stronger magnetism than magnetism acting between the electromagnets 60 and the magnetic bodies 20*m* may be used.

The second cartridge 20 that has started the rotational motion in FIG. 5 may make a rotational motion in the clockwise direction, as shown in FIG. 6, and then reach the position shown in FIG. 7. Before the chamber having the identification number of 2 of the second cartridge 20 reaches the position shown in FIG. 7, the magnetization direction of the electromagnets 60 may be reversed. That is, the magnetization direction of the electromagnets 60 may be changed so that the magnetic pole of one surface of the electromagnet 60 facing the magnetic body 20*m* of the second cartridge 20 has the opposite magnetic pole to the magnetic pole of the outer surface of the magnetic body 20*m*.

When the second cartridge 20 rotates to the position shown in FIG. 7 in a state in which the magnetization direction of the electromagnets 60 is changed, the electromagnets 60 corresponding to the delivery hole 11 apply an attractive force to the magnetic bodies 20*m* corresponding to the chamber having the identification number of 2. By using the attractive force acting between the electromagnets 60 and the magnetic bodies 20*m*, the second cartridge 20 may stop the rotational motion, and the chamber 21 having the identification number of 2 of the second cartridge 20 may be precisely aligned to the position corresponding to the delivery hole 11 and maintained.

For convenience of description, FIGS. 5 through 7 illustrate that the magnetization direction of the plurality of electromagnets 60 and the magnetization direction of the plurality of magnetic bodies 20*m* are the same, but the embodiments are not limited by the magnetization direction of the plurality of electromagnets 60 and the magnetization direction of the plurality of magnetic bodies 20*m*. For example, while one of the chambers 21 is maintained at a position corresponding to the delivery hole 11, as shown in FIG. 7, an electric signal may be applied only to the electromagnets 60 corresponding to the delivery hole 11, and the supply of the electric signal to another electromagnet 60 may be blocked. Alternatively, while the second cartridge 20 is rotating, the magnetization direction of the electromagnets 60 corresponding to the delivery hole 11 and the magnetization direction of the remaining electromagnets 60 may be set differently.

Figure 8:
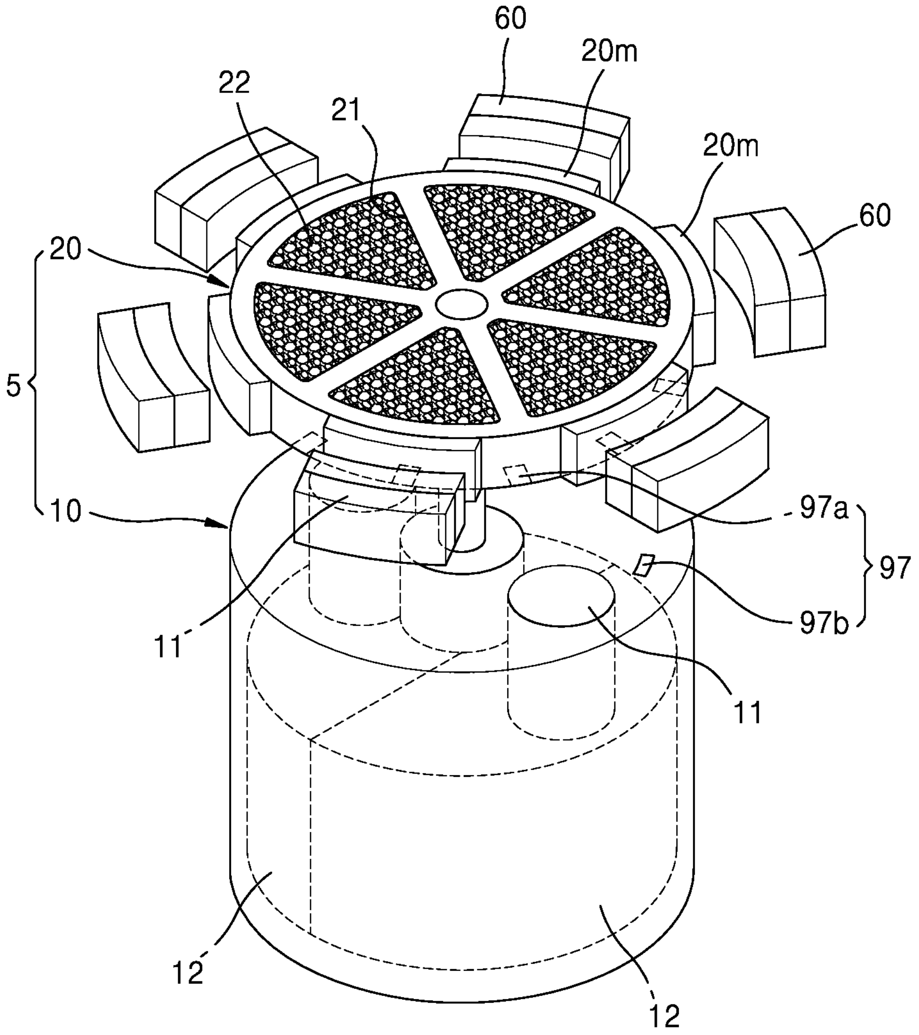
FIG. 8 is a perspective view schematically illustrating some components of an aerosol generating device according to another embodiment.

FIG. 8 is a perspective view schematically illustrating some components of an aerosol generating device according to another embodiment.

In the aerosol generating device according to the embodiment shown in FIG. 8, the aerosol generating assembly 5 may include a first cartridge 10 and a second cartridge 20 that is rotatably coupled to the first cartridge 10.

The first cartridge 10 may include a plurality of reservoirs to accommodate a first material 12, respectively, and a plurality of delivery holes 11 formed to correspond to the plurality of reservoirs. In the aerosol generating device according to the embodiment shown in FIG. 8, the first cartridge 10 includes two reservoirs and two delivery holes 11. However, embodiments are not limited by the configuration of the first cartridge 10, and the number of reservoirs and the number of delivery holes 11 may be variously changed.

An aerosol may be generated when the first material 12 contained in the plurality of reservoirs is vaporized, and may be delivered to the second cartridge 20 through the plurality of delivery holes 11 of the first cartridge 10. When the aerosol is generated in the first cartridge 10, the first material 12 may be vaporized from all or part of the reservoirs of the first cartridge 10.

The second cartridge 20 may include a plurality of chambers 21 for accommodating the second material 22 through which the aerosol delivered from the first cartridge 10 passes and is discharged to the outside. The first cartridge 10 and the second cartridge 20 may be integrally coupled to each other to be handled as one part, thereby forming the aerosol generating assembly 5.

A position sensor 97 for generating a position signal by detecting the position of at least one of the chambers 21 aligned with the delivery hole 11 may be installed between the first cartridge 10 and the second cartridge 20.

The position sensor 97 may include transmitters 97*a* which are arranged apart from each other in a rotation direction (i.e., circumferential direction) of the second cartridge 20, and a receiver 97*b* that is arranged in the first cartridge 10 and detects the transmitters 97*a*. The embodiments are not limited by the arrangement positions or the numbers of transmitters 97*a* and receivers 97*b*. For example, the transmitters 97*a* may be arranged in the first cartridge 10, and the receivers 97*b* may be arranged in the second cartridge 20.

In FIG. 8, each one of transmitters 97*a* may be arranged at a position corresponding to each of the chambers 21 of the second cartridge 20, and an additional transmitter 97*a* may also be arranged at a position between the adjacent chambers 21. Each of the transmitters 97*a* corresponding to the chambers 21 of the second cartridge 20 may generate a signal indicating that its corresponding chamber is aligned with the position of the delivery hole 11. Also, the transmitters 97*a* arranged between the adjacent chambers 21 may generate a signal indicating that the adjacent chambers 21 are simultaneously aligned with the position of the delivery hole 11. In this case, both of the adjacent chambers 21 may perform a function of a chamber in use through which the aerosol passes.

Embodiments are not limited by the arrangement positions and the number of transmitters 97*a* of the position sensor 97. For example, the transmitters 97*a* may be arranged to correspond only to the chambers 21, and the additional transmitters 97*a* arranged between the adjacent chambers in FIG. 8 may be omitted. Alternatively, by modifying the position sensor 97, only a receiver that detects the magnetic bodies 20*m* of the second cartridge 20 may be installed without the transmitters 97*a*.

A plurality of magnetic bodies 20*m* may be arranged apart from each other in the circumferential direction of the second cartridge 20 on the outer surface of the second cartridge 20. A plurality of electromagnets 60 may be arranged at the position apart from the second cartridge 20 so as to correspond to the magnetic bodies 20*m*. The electromagnets 60 may be arranged on a case for supporting the aerosol generating assembly 5.

When the electromagnets 60 operate to exert a repulsive force on the magnetic bodies 20*m* arranged on the outer surface of the second cartridge 20, the second cartridge 20 may rotate so that the relative position of the second cartridge 20 with respect to the first cartridge 10 may be changed.

The plurality of electromagnets 60 may be magnetized simultaneously in the same direction. That is, all of the plurality of electromagnets 60 are magnetized in the same direction so that the surface of the electromagnet 60 facing the magnetic body 20*m* may have the same magnetic pole as that of the outer surface of the magnetic body 20*m*. Accordingly, a repulsive force may be exerted between the plurality of electromagnets 60 and the plurality of magnetic bodies 20*m*.

Embodiments are not limited by the operating method of the electromagnets. For example, some of the plurality of electromagnets 60 and the other ones may be magnetized in different directions.

Some of the plurality of electromagnets 60 may operate to exert a repulsive force on the magnetic body 20*m* in order to change the position of the second cartridge 20 with respect to the first cartridge 10.

Also, the rest of the plurality of electromagnets 60 may operate to exert an attractive force against the magnetic body 20*m* so as to maintain the position of the second cartridge 20 with respect to the first cartridge 10.

While some of the plurality of electromagnets 60 exert a repulsive force on the magnetic body 20*m*, the other ones of the plurality of electromagnets 60 for exerting an attractive force on the magnetic body 20*m* may not operate and wait. After the position of the second cartridge 20 with respect to the first cartridge 10 is adjusted to a desired position, the electromagnets 60 for exerting an attractive force on the magnetic body 20*m* may start operating, and the electromagnets 60 for exerting a repulsive force on the magnetic body 20*m* may stop operating.

By modifying the operating method of the plurality of electromagnets 60 described above, the magnetic poles of the plurality of electromagnets 60 arranged in the rotation direction of the second cartridge 20 may be sequentially reversed.

The plurality of electromagnets 60 may sequentially exert a repulsive force on the magnetic bodies 20*m* of the second cartridge 20. That is, magnetic poles of the plurality of electromagnets 60 may be sequentially changed so that the magnetic pole of a surface of the electromagnet 60 facing the magnetic body 20*m* may be the same as the magnetic pole of the outer surface of the magnetic body 20*m*. Thus, the plurality of electromagnets 60 may rotate the second cartridge 20 by sequentially exerting a repulsive force toward the magnetic body 20*m* by changing the magnetic poles of the plurality of electromagnets 60 sequentially.

By modifying the operating method of the plurality of electromagnets 60 described above, the plurality of electromagnets 60 may sequentially act an attractive force on the magnetic bodies 20*m* of the second cartridge 20. As the magnetic poles of the plurality of electromagnets 60 in the rotation direction of the second cartridge 20 are sequentially changed, the magnetic pole of a surface of each electromagnet 60 facing the magnetic body 20*m* may be opposite to the magnetic pole of the outer surface of the magnetic body 20*m*. As a result, the attractive force may sequentially act toward the magnetic bodies 20*m* so that the second cartridge 20 may be rotated.

Figure 9:
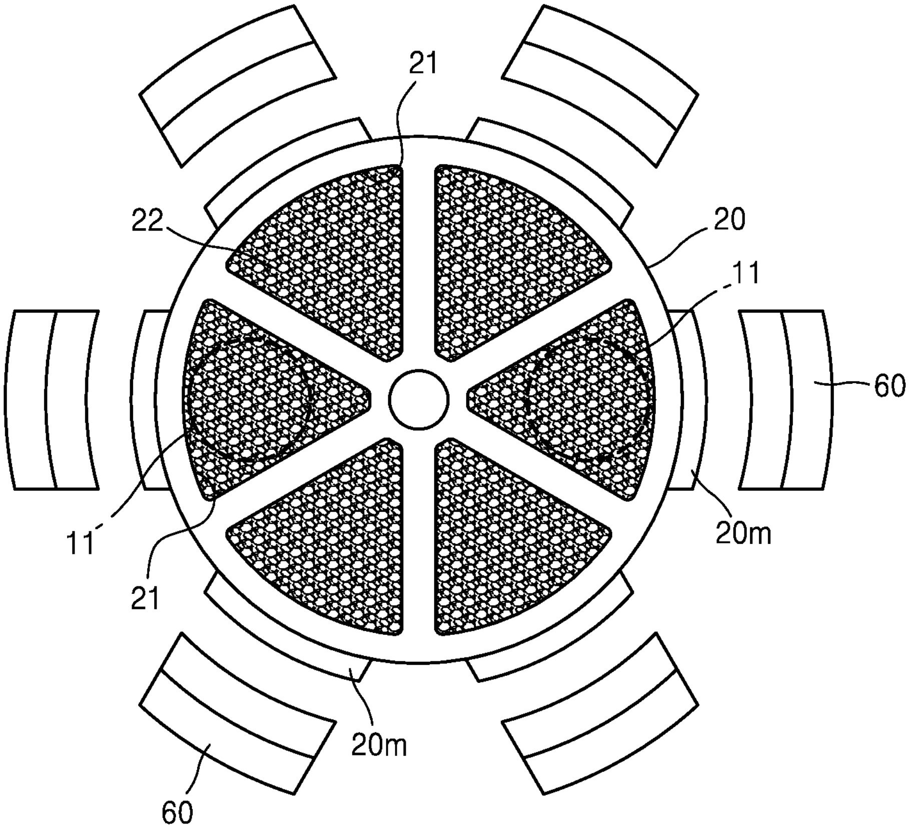
FIG. 9 is a latitudinal cross-sectional view illustrating one operating state of the aerosol generating device shown in FIG. 8.

FIG. 9 is a latitudinal cross-sectional view illustrating one operating state of the aerosol generating device shown in FIG. 8.

The second cartridge 20 may be rotated by the repulsive force exerted between the magnetic body 20*m* and the electromagnet 60 so that the relative position of the second cartridge 20 with respect to the first cartridge 10 may be changed. As shown in FIG. 9, the rotation position of the second cartridge 20 with respect to the first cartridge 10 may be aligned so that the position of one of the chambers 21 of the second cartridge 20 may correspond to the position of one delivery hole 11. In the aligned state shown in FIG. 9, the aerosol delivered through one delivery hole 11 may pass through the aligned chamber so that the function of a chamber in use for changing the characteristics of the aerosol may be performed.

Figure 10:
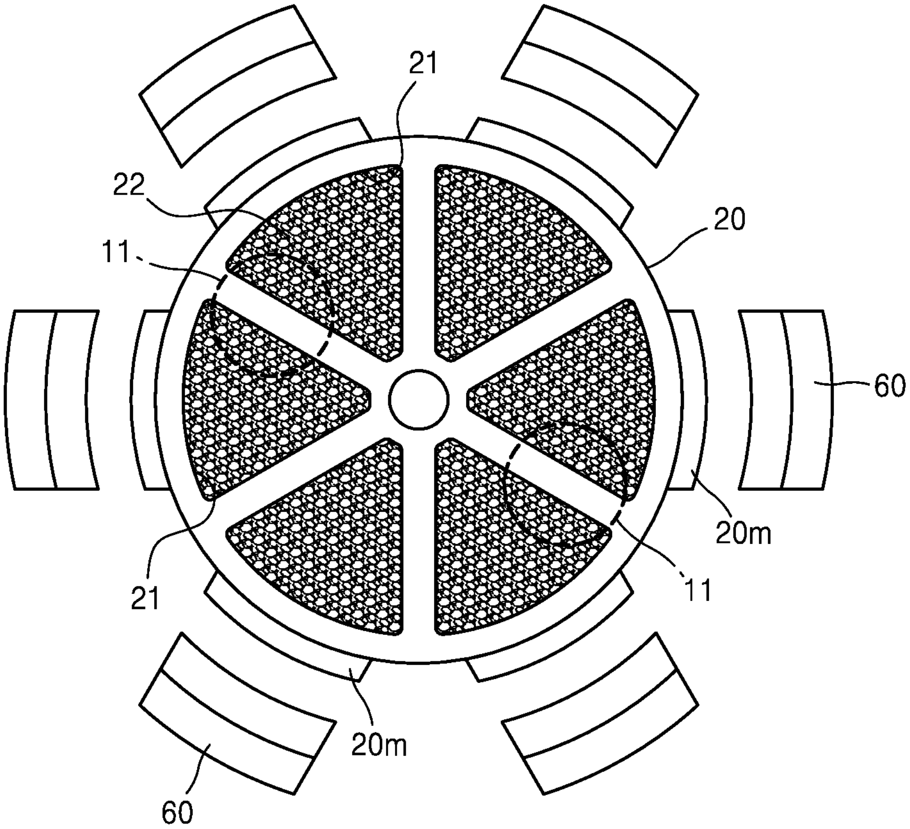
FIG. 10 is a latitudinal cross-sectional view illustrating another operating state of the aerosol generating device shown in FIG. 8.

FIG. 10 is a latitudinal cross-sectional view illustrating another operating state of the aerosol generating device shown in FIG. 8.

When the relative position of the second cartridge 20 with respect to the first cartridge 10 is changed by rotating the second cartridge 20 by a repulsive force exerted between the magnetic body 20*m* and the electromagnet 60, as shown in FIG. 10, the positions of two adjacent chambers 21 may correspond to the position of the one delivery hole 11. In other words, multiple chambers may be in fluid communication with the delivery hole 11 at the same time.

In FIG. 10, each of two adjacent chambers among the chambers 21 of the second cartridge 20 may be positioned to overlap a region corresponding to half of one delivery hole 11. However, embodiments are not limited thereto. For example, the overlapping areas between the delivery hole 11 and two adjacent chambers may be different from each other.

For example, a first chamber may be positioned to overlap an area corresponding to about 80% of the delivery hole 11, and a second chamber may be positioned to overlap an area corresponding to about 20% of the delivery hole 11 until the useful life associated with the function of passing the aerosol through the second material 22 contained in the first chamber reaches 20%.

As another example, when the useful life associated with the function of passing the aerosol through the second material 22 contained in one of the two adjacent chambers 21 reaches 60%, the chamber may be positioned to overlap an area corresponding to about 40% of the delivery hole 11, and the other of the two adjacent chambers 21 may be positioned to overlap an area corresponding to about 60% of the delivery hole 11.

As another example, when the useful life associated with the function of passing the aerosol through the second material 22 contained in one of the two adjacent chambers 21 reaches 80%, the chamber may be positioned to overlap an area corresponding to about 20% of the delivery hole 11, and the other of the two adjacent chambers 21 may be positioned to overlap an area corresponding to about 80% of the delivery hole 11.

The useful life associated with the function of passing the aerosol through the second material 22 contained in one of the two adjacent chambers 21 of the second cartridge 20 may be considered to determine a pre-set condition used to change the relative positions of the first cartridge 10 and the second cartridge 20 by using the controller, as described above.

Also, as described above, when the area in which the adjacent chambers 21 overlap the delivery hole 11 by rotating the second cartridge 20 considering the useful life of the second material 22 of the chambers 21, the second cartridge 20 may be intermittently moved according to a change of time, or the second cartridge 20 may be continuously moved according to a change of time.

As illustrated in FIG. 10, according to a method of aligning adjacent chambers with one delivery hole 11, an operation of generating the aerosol in the first cartridge 10 and delivering the generated aerosol to the second cartridge 20 may be continuously performed while the second cartridge 20 rotates with respect to the first cartridge 10.

Also, the relative positions of the first cartridge 10 and the second cartridge 20 may be changed so that a chamber through which the aerosol passes may be sequentially selected from among the plurality of chambers 21. When the second cartridge 20 rotates to change the chamber in use, the position of the previous chamber in use may not immediately depart from the delivery hole 11. Accordingly, for a certain time period, the aerosol may pass through the previous chamber in use and a subsequent chamber in use simultaneously.

According to this operating method, while the relative positions of the first cartridge 10 and the second cartridge 20 are changed, characteristics such as temperature, humidity and flavor of the aerosol delivered to the user do not change rapidly, so that a steady and stable supply of an aerosol is possible.

Also, if each of the plurality of chambers 21 of the second cartridge 20 includes the second material 22 having different characteristics, when the aerosol passes through the adjacent chambers, the characteristics such as ingredients and flavors of the aerosol may be changed. Accordingly, various types of aerosols may be provided to the user.

Figure 11:
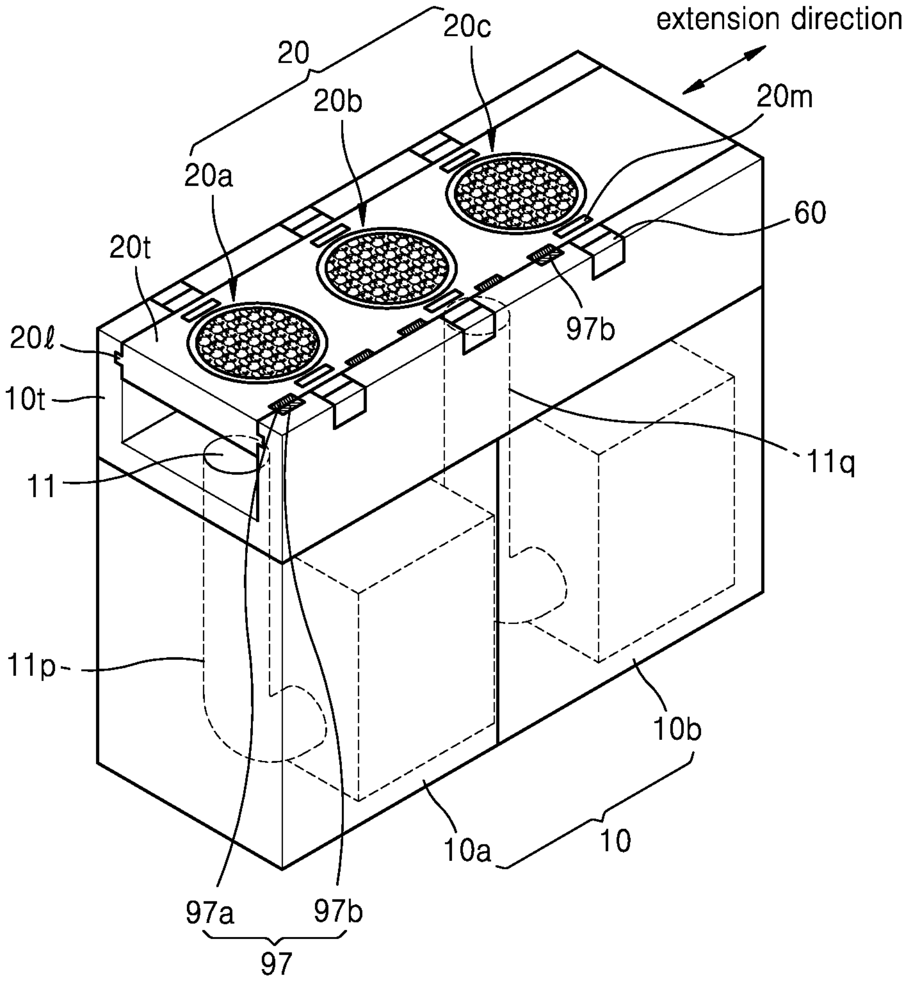
FIG. 11 is a perspective view schematically illustrating some components of an aerosol generating device according to another embodiment.

FIG. 11 is a perspective view schematically illustrating some components of an aerosol generating device according to another embodiment.

The aerosol generating device according to the embodiment shown in FIG. 11 may include a first cartridge 10 including reservoirs 10*a* and 10*b* that are separated from each other and accommodate a first material, a second cartridge 20 that is coupled to the first cartridge 10 to be movable linearly, a magnetic body 20*m* arranged in the second cartridge 20 so as to linearly move the second cartridge 20, and an electromagnet 60 arranged in the first cartridge 10.

Embodiments are not limited by the arrangement positions and the number of magnetic bodies 20*m* and electromagnets 60. For example, when the first cartridge 10 is modified to be linearly moved with respect to the second cartridge 20 in the aerosol generating device, the magnetic body 20*m* may be arranged in the first cartridge 10. In this case, the electromagnet 60 may be arranged in a case or the second cartridge 20 that allows the first cartridge 20 to be linearly moved, and may be positioned to correspond to the electromagnet 20*m*.

The first cartridge 10 may include passages 11*p* and 11*q* through which the aerosol generated by being vaporized from the first material accommodated in each of the reservoirs 10*a* and 10*b* is delivered, and a delivery hole 11 formed in each end of the passages 11*p* and 11*q*.

The first cartridge 10 may include a linear guide 10*t* that extends linearly above an upper portion of the delivery hole 11, and the second cartridge 20 may include a rail 201 that is slidably coupled to the linear guide 10*t*. The second cartridge 20 may be linearly moved in the extension direction of the linear guide 10*t* of the first cartridge 10. The second cartridge 20 may include a plate-shaped main body 20*t* that extends long in the extension direction of the linear guide 10*t*, and a plurality of chambers 20*a*, 20*b*, and 20*c*, which are sequentially arranged apart from each other in the extension direction of the main body 20*t*.

A plurality of electromagnets 60 may be arranged to be apart from each other along the direction of the linear motion of the second cartridge 20. A plurality of magnetic bodies 20*m* may be arranged to be apart from each other in the direction of the linear motion of the second cartridge 20 so as to correspond to the positions of the electromagnets 60.

Polarities of the plurality of electromagnets 60 may be sequentially reversed in the direction of the linear motion of the second cartridge 20. That is, the polarities of the plurality of electromagnets 60 are sequentially reversed so that a surface of the electromagnet 60 facing the magnetic body 20*m* may have the same magnetic pole as that of the outer surface of the magnetic body 20*m*. Thus, a repulsive force may be exerted between the electromagnet 60 and the magnetic body 20*m*, thereby linearly moving the second cartridge 20.

Embodiments are not limited by the operating method of the plurality of electromagnets 60 described above. For example, some of the plurality of electromagnets 60 may only operate to exert a repulsive force on the magnetic body 20*m*. In this case, the rest of the plurality of electromagnets 60 may only operate to act an attractive force on the magnetic body 20*m* so that some of the plurality of chambers 20*a*, 20*b*, and 20*c* of the second cartridge 20 may be maintained at a position corresponding to the delivery hole 11.

In FIG. 11, two reservoirs 10*a* and 10*b* may be arranged, and three chambers 20*a*, 20*b*, and 20*c* may be arranged. However, the number of reservoirs and the number of chambers may be variously modified.

As the second cartridge 20 is linearly moved, one or more of the chambers 20*a*, 20*b*, and 20*c* may be aligned to correspond to the position of one delivery hole 11. Also, the position of one group among the chambers 20*a*, 20*b*, and 20*c* of the second cartridge 20 may be aligned to correspond to the position of one of two delivery holes 11, and simultaneously, the position of another group of the chambers 20*a*, 20*b*, and 20*c* may be aligned to correspond to the position of the other one of two delivery holes 11.

A position sensor 97 that generates a signal by detecting the position of at least one of the chambers 20*a*, 20*b*, and 20*c* with respect to the delivery hole 11 may be installed between the first cartridge 10 and the second cartridge 20.

The position sensor 97 may include transmitters 97*a* that are apart from each other in the direction of the linear motion of the second cartridge 20 in the second cartridge 20, and receivers 97*b* that are arranged in the first cartridge 10 and detect the transmitters 97*a*. Embodiments are not limited by the arrangement positions or the number of transmitters 97*a* and receivers 97*b*. For example, the transmitters 97*a* may be arranged in the first cartridge 10, and the receivers 97*b* may be arranged in the second cartridge 20.

The transmitters 97*a* and the receivers 97*b* of the position sensor 97 may be implemented by an optical sensor such as a photocoupler, a magnetic sensor that detects a magnetism by using the Hall effect, an electric resistance sensor that detects changes in electric resistance, a switch that generates a signal according to a physical contact or a combination thereof.

By modifying the position sensor 97, only a receiver that detects the magnetic body 20*m* by using a magnetic sensor that senses magnetism may be installed, without any separate transmitter.

Figure 12:
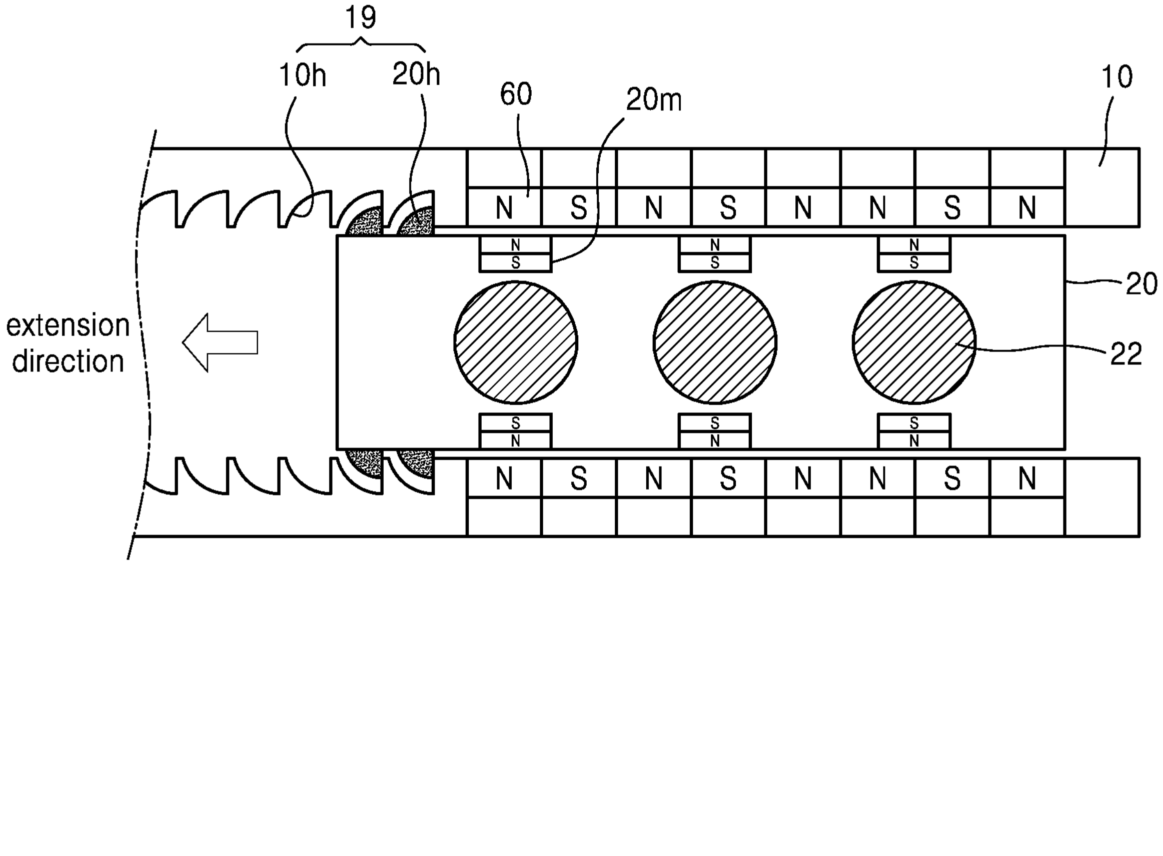
FIG. 12 is a cross-sectional view illustrating an aerosol generating device according to another embodiment.

FIG. 12 is a cross-sectional view illustrating an aerosol generating device according to another embodiment.

In the aerosol generating device according to the embodiment shown in FIG. 12, as with the embodiment of FIG. 11, the second cartridge 20 including a plurality of chambers that accommodate the second material 22 may be linearly moved with respect to the first cartridge 10 along an extension direction of the first cartridge 10.

A plurality of electromagnets 60 may be arranged to be apart from each other along the direction of the linear motion of the second cartridge 20. A plurality of magnetic bodies 20*m* may be arranged to be apart from each other along the direction of the linear motion of the second cartridge 20 so as to correspond to the positions of the electromagnets 60.

The polarities of the plurality of electromagnets 60 may be sequentially reversed along the direction of the linear motion of the second cartridge 20. That is, the polarities of the plurality of electromagnets 60 may be sequentially reversed so that a surface of the electromagnet 60 facing the magnetic body 20*m* has the same magnetic pole as that of the outer surface of the magnetic body 20*m*. Accordingly, a repulsive force exerted between the electromagnet 60 and the magnetic body 20*m* to pull the second cartridge 20 or an attractive force acts between the electromagnet 60 and the magnetic body 20*m* to push the second cartridge 20 and thus, the second cartridge 20 may be linearly moved with respect to the first cartridge 10.

A movement limiter 19 may be disposed between the first cartridge 10 and the second cartridge 20 to limit the direction of the linear motion of the second cartridge 20 in which the magnetic body 20*m* is arranged, to only one direction. The movement limiter 19 may include protrusions 20*h* that protrude toward the outside of the second cartridge 20, and accommodation grooves 10*h* that are formed in the first cartridge 10 and accommodate the protrusions 20*h*. The motion direction of the second cartridge 20 is limited by the movement limiter 19 only to the left-facing direction in FIG. 12.

In FIG. 12, because the right side of the protrusions 20*h* of the second cartridge 20 is in contact with the accommodation grooves 10*h*, the second cartridge 20 may not be moved in the right-facing direction with respect to the first cartridge 10.

When a force acts on the second cartridge 20 caused by a change in magnetism acting between the magnetic body 20*m* and the electromagnet 60, the second cartridge 20 may be moved only toward the left side in FIG. 12. When the second cartridge 20 is pressed to the left side by magnetism acting between the magnetic body 20*m* and the electromagnet 60, the protrusions 20*h* of the second cartridge 20 may come out of the accommodation grooves 10*h*. Thus, the second cartridge 20 may be moved to the left side. In order for the protrusions 20*h* to come out of the accommodation grooves 10*h*, a portion of the first cartridge 10 in which the accommodation grooves 10*h* are formed may include rubber or elastic plastic having a slight elasticity.

Figure 13:
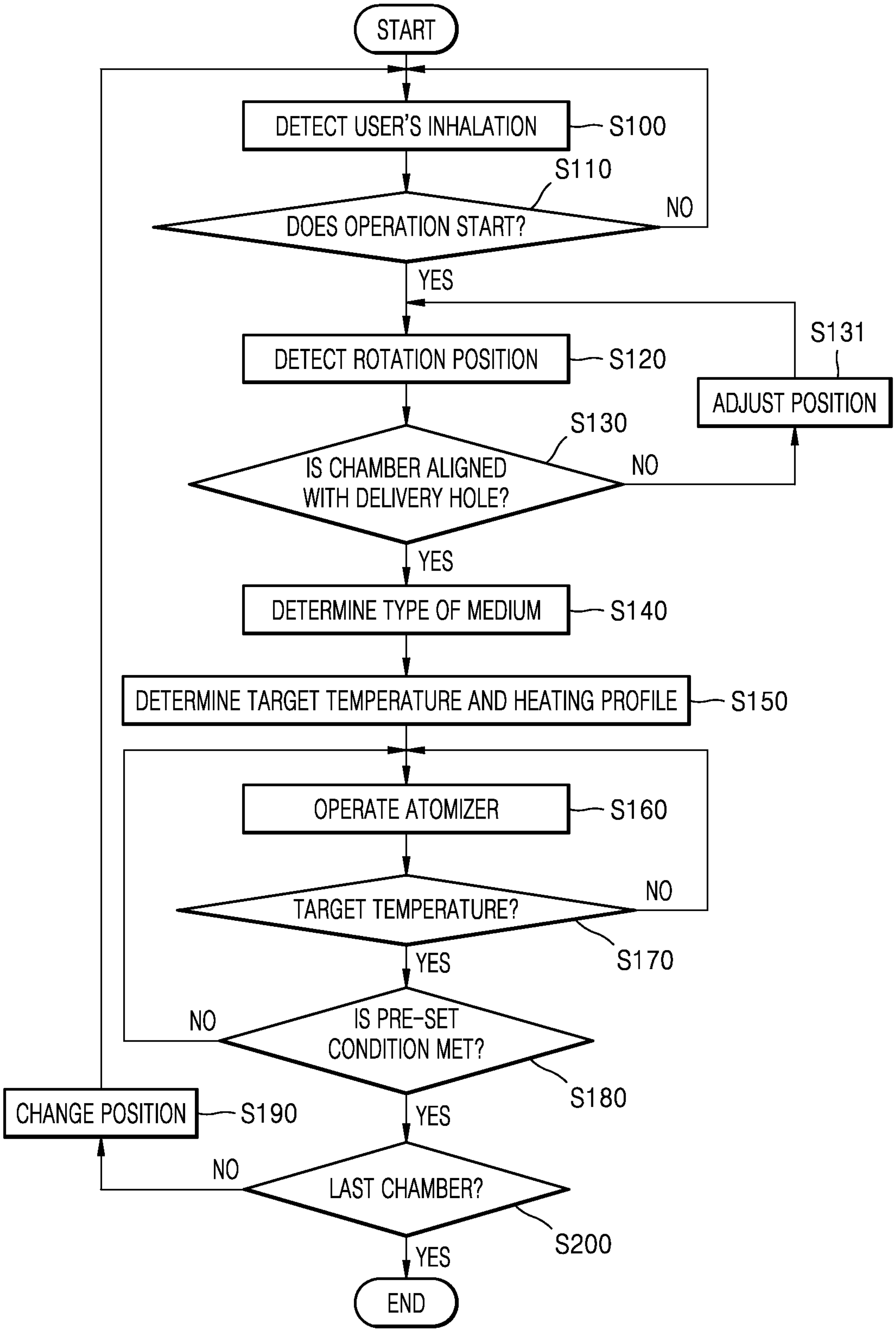
FIG. 13 is a flowchart schematically illustrating a method of generating an aerosol by using the aerosol generating device according to embodiments shown in FIGS. 1 through 12, according to an embodiment.

FIG. 13 is a flowchart schematically illustrating a method of generating an aerosol by using the aerosol generating device according to embodiments shown in FIGS. 1 through 12, according to an embodiment.

The method of generating an aerosol according to the embodiment of FIG. 13 may include detecting a user's inhalation action (S100), determining whether the inhalation operation has been detected, and starting an operation of supplying an aerosol (S110), detecting a rotation position of the second cartridge with respect to the first cartridge (S120), determining whether at least one chamber of the second cartridge is aligned with the delivery hole (S130), when no chamber is aligned with the delivery hole, adjusting the rotation position of the second cartridge (S131), when at least one chamber is aligned with the delivery hole, determining the type of a medium currently in use to supply the aerosol (e.g. the type of the second material based on the signal of the rotation position of the second cartridge) (S140), determining at least one of a target temperature for the operation of an atomizer and a heating profile for controlling a heating operation of the atomizer based on the determined type of the medium (S150), operating the atomizer based on the target temperature or the heating profile (S160), detecting a current temperature and comparing the current temperature with the target temperature (S170), determining whether a pre-set condition is met (S180), when the pre-set condition is met, checking whether a current chamber in use is the last chamber among chambers of the second cartridge (S200), and when the current chamber in use is not the last chamber, changing relative positions of the first cartridge and the second cartridge (S190).

A pre-set for changing the relative positions of the first cartridge and the second cartridge may include a cumulative operating time of a heater or a combination of the cumulative time of the heater and the heating temperature of the heater Alternatively, the pre-set condition for changing the relative positions of the first cartridge and the second cartridge may include at least one of the number of puff actions determined based on a signal detected by a puff sensor and the cumulative time of the puff actions.

Alternatively, the pre-set condition for changing the relative positions of the first cartridge and the second cartridge may include a usage time determined based on an input signal generated when an input device receives the user's input.

By changing the relative positions of the first cartridge and the second cartridge (S190), a chamber in use, among the chambers of the second cartridge, through which the aerosol currently passes may be replaced so that the position of a subsequent chamber may be aligned with a delivery hole of the first cartridge. The changing of the relative positions of the first cartridge and the second cartridge (S190) may be automatically performed by an electromagnet operated by a controller or by the user's manual manipulation.

The changing of the relative positions of the first cartridge and the second cartridge (S190) may include, when the pre-set condition is met, providing a notification of the need to change positions of the chambers to the user, receiving an input signal generated when the user manipulates the input device, providing information about a chamber, among the chambers of the second cartridge, which is aligned with a delivery hole of the first cartridge to the user, and changing the position of at least one of the first cartridge and the second cartridge by operating the electromagnet based on input manipulation received from the input device.

When the relative positions of the first cartridge and the second cartridge are changed, the chamber in use may immediately depart from the position corresponding to the delivery hole, the subsequent chamber may be aligned with the delivery hole and then, the aerosol may pass through the subsequent chamber. Alternatively, the chamber in use and the subsequent chamber may perform an operation of passing the aerosol temporarily together, and as time passes, only the subsequent chamber may perform the operation of passing the aerosol.

After the changing of the relative positions of the first cartridge and the second cartridge (S190), the method may return to detecting of the user's inhalation operation (S100), thereby repeatedly performing the above-described operations.

Even when the first cartridge of the aerosol generating device is designed to accommodate a large amount of the first material, the second cartridge may be automatically rotated by the electromagnet to change a chamber in use. Accordingly, the second cartridge including the second material may provide the user with a new second material without replacing the second cartridge including the second material.

In addition, because the chambers of the second cartridge may include different types of second material, the user may select one of the chambers to select a desired second material so that the user may freely enjoy an aerosol having various flavors.

Figure 14:
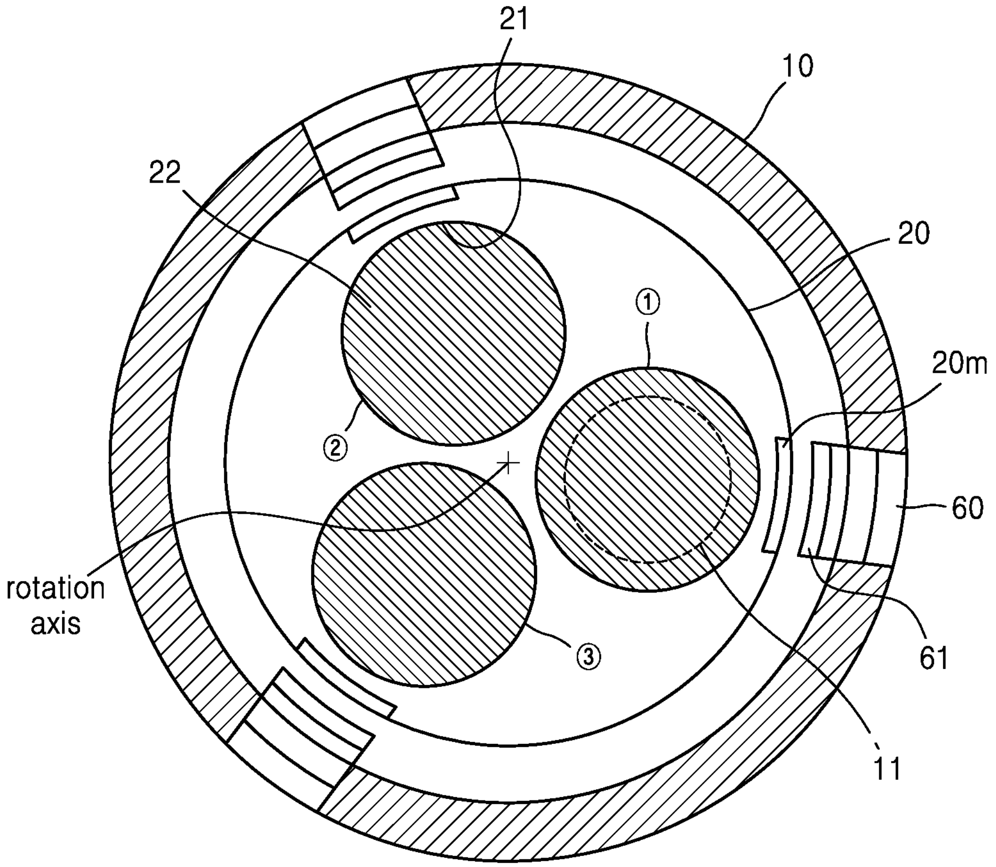
FIG. 14 is a latitudinal cross-sectional view illustrating one operating state of an aerosol generating device according to another embodiment.

FIG. 14 is a latitudinal cross-sectional view illustrating one operating state of an aerosol generating device according to another embodiment. The aerosol generating device according to the embodiment shown in FIG. 14 is generally similar to the aerosol generating device according to the embodiment shown in FIGS. 5 through 7.

The aerosol generating device according to the embodiment shown in FIG. 14 may include a first cartridge 10 including a delivery hole 11 through which an aerosol is delivered, a second cartridge 20 that includes three chambers 21 which respectively have unique identification numbers of 1, 2, and 3 for accommodating a second material 22 and rotates about a rotation axis with respect to the first cartridge 10, an electromagnet 60 arranged in the first cartridge 10 and a magnetic body 20*m* arranged in the second cartridge 20 so as to rotate the second cartridge 20 with respect to the first cartridge 10, and a position maintenance magnetic body 61 that acts an attractive force on the magnetic body 20*m* to maintain the position of the second cartridge 20 with respect to the first cartridge 10.

The position maintenance magnetic body 61 may include a permanent magnet or a metal subjected to magnetism of the magnetic body 20*m*. When the position maintenance magnetic body 61 is a permanent magnet, the magnetic body 20*m* and the position maintenance magnetic body 61 may have opposite magnetic poles on surfaces facing each other so that an attractive force may act between the magnetic body 20*m* and the position maintenance magnetic body 61.

In the state shown in FIG. 14, the position maintenance magnetic body 61 pulls the electromagnet 60 corresponding to the chamber with the identification number of 1 among the chambers 21, so that the second cartridge 20 may be maintained at a position at which the chamber with the identification number of 1 is aligned with the delivery hole 11.

In order to change the position of the second cartridge 20 with respect to the first cartridge 10, the magnitude of the repulsive force of the electromagnet 60 exerted on the magnetic body 20*m* may be set stronger than the magnitude of an attractive force acting between the position maintenance magnetic body 61 and the magnetic body 20*m*.

When the electromagnet 60 is magnetized by an electric signal applied to the electromagnet 6, a repulsive force is exerted between the electromagnet 60 and the magnetic body 20*m*. Because the magnitude of the repulsive force exerted between the electromagnet 60 and the magnetic body 20*m* is stronger than the magnitude of the attractive force between the position maintenance magnetic body 61 and the magnetic body 20*m*, the second cartridge 20 may start a rotational motion by the repulsive force exerted between the electromagnet 60 and the magnetic body 20*m*.

The operation of the electromagnet 60 may be stopped by blocking the application of an electrical signal to the electromagnet 60 while the second cartridge 20 rotates. When the magnetic body 20*m* corresponding to the chamber with the identification number of 2 reaches the position of the position maintenance magnetic body 61, the second cartridge 20 may be maintained at a position at which the chamber with the identification number of 2 is aligned with the delivery hole 11 by the attractive force acting between the magnetic body 20*m* and the position maintenance magnetic body 61.

In the aerosol generating device according to the above-described embodiment, an electric signal may be applied to the electromagnet 60 only when the second cartridge 20 is rotating. In this case, at least one of the chambers 21 of the second cartridge 20 may be maintained at a position at which it is aligned with the delivery hole 11 by using the attractive force acting between the position maintenance magnetic body 61 and the magnetic body 20*m*. Thus, power consumption required to rotate the second cartridge 20 or maintain the position of the second cartridge 20 may be minimized.

In FIG. 14, three magnetic bodies 20*m* and three electromagnets 60 are arranged. However, embodiments are not limited by the arrangement positions and the number of magnetic bodies 20*m* and electromagnets 60. For example, the number of magnetic bodies 20*m* and/or electromagnets 60 may be increased so that the relative position of the second cartridge 20 with respect to the first cartridge 10 may be more finely adjusted.

Figure 15:
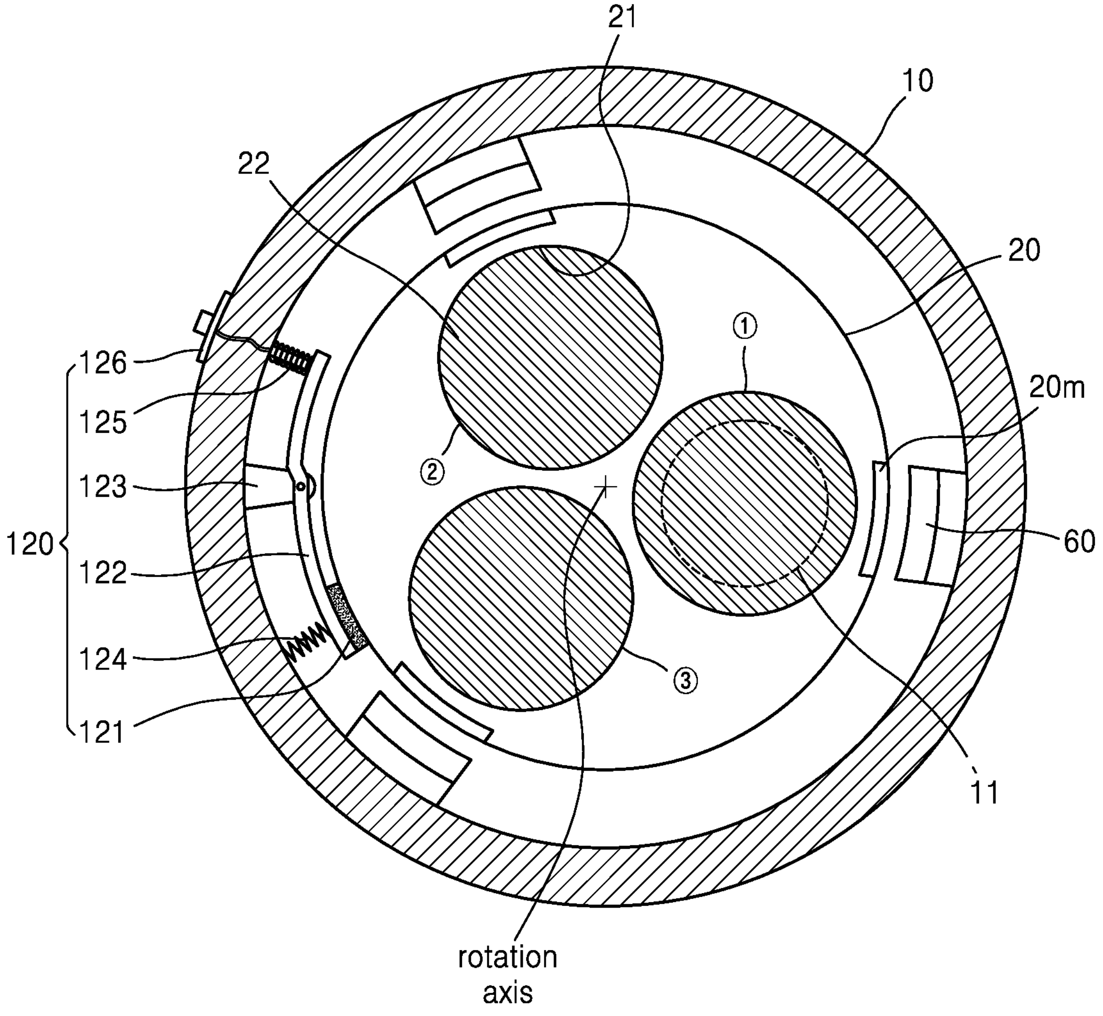
FIG. 15 is a latitudinal cross-sectional view illustrating one operating state of an aerosol generating device according to another embodiment.

FIG. 15 is a latitudinal cross-sectional view illustrating one operating state of an aerosol generating device according to another embodiment.

The aerosol generating device according to the embodiment shown in FIG. 15 may include a first cartridge 10, a second cartridge 20 that is arranged to be rotatable about a rotation axis with respect to the first cartridge 10, an electromagnet 60 and a magnetic body 20*m* for rotating the second cartridge 20, and a solenoid switch 120 for maintaining the position of the second cartridge 20 with respect to the first cartridge 10.

In the aerosol generating device according to the embodiment shown in FIG. 15, the solenoid switch 120 may be in contact with the second cartridge 20 so that the position of the second cartridge 20 may be maintained. In the state shown in FIG. 15, the solenoid switch 120 may maintain the position of the second cartridge 20 at a position at which the chamber with the identification number of 1 is aligned with the delivery hole 11.

The solenoid switch 120 may include a support shaft 123 disposed on an inner surface of the first cartridge 10, a pivot arm 122 connected to the support shaft 123 so as to be pivotable, a stopper 121 that is disposed at one side of the pivot arm 122 and comes into contact with the second cartridge 20 to limit the rotational motion of the second cartridge 20, a solenoid assembly 125 that is disposed at the other side of the pivot arm 122 and operates by a signal applied from the outside, a circuit unit 126 that transmits the signal, and an elastic body 124 that elastically presses one side of the pivot arm 122 toward the second cartridge 20.

When a signal is not applied to the solenoid switch 120, the pivot arm 122 may be pressed counterclockwise with respect to the support shaft 123 by the elastic body 124, as shown in FIG. 15. That is, the initial position of the solenoid switch 120 is a position at which the stopper 121 comes into contact with the second cartridge 20 to limit the rotational motion of the second cartridge 20.

When a signal is applied to the solenoid switch 120, the solenoid assembly 125 presses the other side of the pivot arm 122, so that the pivot arm 122 may be rotated clockwise with respect to the support shaft 123 in FIG. 15. As the pivot arm 122 rotates clockwise against the pressing action of the elastic body 124, the stopper 121 may move to be separated from the outer surface of the second cartridge 20 such that the second cartridge 20 may rotate freely.

If the position of the second cartridge 20 with respect to the first cartridge 10 needs to be changed, an electric signal may be applied to the electromagnet 60 to operate the electromagnet 60 after the second cartridge 20 is becomes rotatable by applying a signal to the solenoid switch 120. The electromagnet 60 may be magnetized so that the magnetic pole of a surface of the electromagnet 60 facing the magnetic body 20*m* may be the same as the magnetic pole of the outer surface of the magnetic body 20*m*, so that a repulsive force may exert between the electromagnet 60 and the magnetic body 20*m*. The second cartridge 20 may start a rotational motion by the repulsive force exerted between the electromagnet 60 and the magnetic body 20*m*.

While the second cartridge 20 rotates, when the magnetic body 20*m* corresponding to the chamber with the identification number of 2 among the chambers 21 of the second cartridge 20 reaches the position of the position maintenance magnetic body 61, by stopping the application of a signal to the solenoid switch 120, the stopper 121 of the solenoid switch 120 may come into contact with the outer surface of the second cartridge 20 to limit the rotational motion of the second cartridge 20. Although not shown in FIG. 15, in order to detect a state where the positions of the chambers 21 of the second cartridge 20 are aligned with the delivery hole 11, a sensor for detecting the positions of the chambers 21 may be arranged between the first cartridge 10 and the second cartridge 20.

In a state in which the rotational motion of the second cartridge 20 with respect to the first cartridge 10 is stopped, application of the signal to the electromagnet 60 may be stopped. Also, a function of maintaining a state in which at least one of the chambers 21 of the second cartridge 20 is aligned with the delivery hole 11 may be performed by the solenoid switch 120.

In the aerosol generating device according to the above-described embodiment, the solenoid switch 120 may limit the rotational motion of the second cartridge 20 so that the aligned position of the second cartridge 20 with respect to the first cartridge 10 may be maintained. Also, because electricity does not need to be applied to the solenoid switch 120 and the electromagnet 60 while the solenoid switch 120 limits the rotational motion of the second cartridge 20, power consumption required to rotate the second cartridge 20 or maintain the position of the second cartridge 20 may be minimized.

Figure 16:
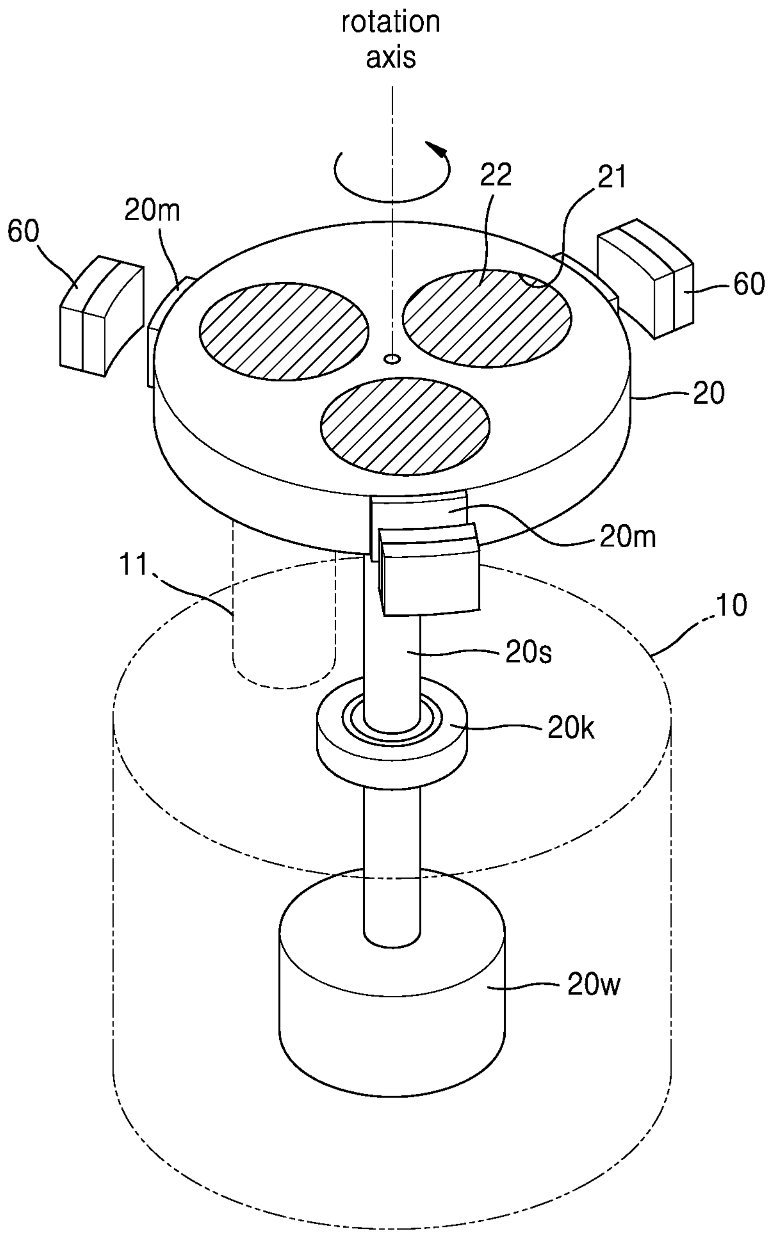
FIG. 16 is a perspective view schematically illustrating some components of an aerosol generating device according to another embodiment.

FIG. 16 is a perspective view schematically illustrating some components of an aerosol generating device according to another embodiment.

The aerosol generating device according to the embodiment shown in FIG. 16 may include a first cartridge 10 including a delivery hole 11 through which an aerosol is delivered, a second cartridge 20 that includes a plurality of chambers 21 for accommodating a second material 22 and rotates about a rotation axis with respect to the first cartridge 10, a rotation shaft 20*s* that rotates with the second cartridge 20, an one-way clutch 20*w* that is coupled to the rotation shaft 20*s* and allows one-way rotation of the rotation shaft 20*s*, and an electromagnet 60 and a magnetic body 20*m* for rotating the second cartridge 20.

The rotation shaft 20*s* that rotates with the second cartridge 20 may be rotatably arranged in the first cartridge 10 by a bearing 20*k*. One end of the rotation shaft 20*s* may be connected to the second cartridge 20, and the one-way clutch 20*w* disposed in the first cartridge 10 or a case may be connected to the other end of the rotation shaft 20*s*.

The one-way clutch 20*w* may allow the rotation shaft 20*s* and the second cartridge 20 to rotate in the counterclockwise direction in FIG. 16, and may perform a function of limiting rotation of the rotation shaft 20*s* and the second cartridge 20 in the clockwise direction.

The one-way clutch 20*w* may be a mechanical device that includes mechanical elements such as a gear and a bearing, to enable mechanical contact and separation between the elements along the axial direction of the rotation shaft 20*s* such that the rotation shaft 20*s* rotates only in one direction. The one-way clutch 20*w* may be, for example, a one-way bearing.

Alternatively, the one-way clutch 20*w* may be an electronic mechanical element that includes an electronic clutch or switching element operating by an electrical signal, to implement one-way rotation of the rotation shaft 20*s*.

In the aerosol generating device according to the above-described embodiment, repulsive force may be exerted between the electromagnet 60 and the magnetic body 20*m* by operating the electromagnet 60 so that the second cartridge 20 may rotate with respect to the first cartridge 10. Because the rotational motion of the second cartridge 20 is limited to only one direction by the one-way clutch 20*w*, when repulsive force exerts between the electromagnet 60 and the magnetic body 20*m*, as shown in FIG. 16, the second cartridge 20 may rotate only in the counterclockwise direction.

In order to maintain a state in which at least one of the chambers 21 of the second cartridge 20 is aligned with the delivery hole 11 of the first cartridge 10, the magnetization direction of the electromagnet 60 may be changed so that an attractive force may act between the electromagnet 60 and the magnetic body 20*m*. Alternatively, in order to maintain the position of the second cartridge 20, the elements included in the embodiments shown in FIGS. 14 and 15 may be applied to the aerosol generating device according to the embodiment shown in FIG. 16.

Also, although not shown in FIG. 16, in order to detect a state where the positions of the chambers 21 of the second cartridge 20 with respect to the delivery hole 11, a sensor for detecting the positions of the chambers 21 may be arranged between the first cartridge 10 and the second cartridge 20.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

INDUSTRIAL APPLICABILITY

One or more embodiments of the present disclosure relate to an aerosol generating device, whereby the relative position of a second cartridge with respect to a first cartridge may be adjusted and thus it is convenient to carry and use the aerosol generating device.

The invention claimed is:

1. An aerosol generating device comprising:

a first cartridge configured to accommodate a first material and comprising a delivery hole through which an aerosol generated from the first material is delivered;

a second cartridge comprising a plurality of chambers for accommodating a second material through which the aerosol delivered from the first cartridge passes, and movably coupled to the first cartridge such that a position of the second cartridge with respect to the first cartridge is changeable;

a magnetic body arranged in one of the second cartridge and the first cartridge; and an electromagnet arranged in the other of the second cartridge and the first cartridge to face the magnetic body, and configured to generate magnetism toward the magnetic body such that the one of the first cartridge and the second cartridge moves with respect to the other.

2. The aerosol generating device of claim 1, wherein the electromagnet is configured to exert a repulsive force on the magnetic body such that the position of the second cartridge with respect to the first cartridge is changed.

3. The aerosol generating device of claim 2, wherein the electromagnet is configured to exert an attractive force on the magnetic body such that movement of the one of the first cartridge and the second cartridge stops when at least one of the chambers is aligned with the delivery hole.

4. The aerosol generating device of claim 2, further comprising a position maintenance magnetic body configured to pull the magnetic body to maintain the position of the second cartridge with respect to the first cartridge.

5. The aerosol generating device of claim 4, wherein a magnitude of the repulsive force acting on the magnetic body is greater than a magnitude of the attractive force acting on the magnetic body such that the position of the second cartridge with respect to the first cartridge is changed.

6. The aerosol generating device of claim 1, wherein a plurality of electromagnets are arranged on a movement path of the one of the first cartridge and the case, at least one of the plurality of electromagnets is configured to push the magnetic body to change the position of the second cartridge with respect to the first cartridge, and at least one of the plurality of electromagnets is configured to pull the magnetic body to maintain the position of the second cartridge with respect to the first cartridge.

7. The aerosol generating device of claim 1, wherein the first cartridge comprises a plurality of reservoirs for accommodating the first material, and each of the plurality of reservoirs comprises the delivery hole, and the electromagnet is configured to change the position of the second cartridge with respect to the first cartridge such that at least one of the chambers is aligned with the delivery hole of one of the reservoirs.

8. The aerosol generating device of claim 1, wherein the one of the first cartridge and the second cartridge is rotatably coupled to the other one of the first cartridge and the second cartridge.

9. The aerosol generating device of claim 8, wherein a plurality of electromagnets are arranged in the one of the first cartridge and the case in a rotation direction, and polarities of the plurality of electromagnets are sequentially reversed such that the one of the first cartridge and the second cartridge rotates in the rotation direction.

10. The aerosol generating device of claim 8, further comprising:

a rotation shaft connected to the one of the first cartridge and the second cartridge such that the rotation shaft rotates along with the one of the first cartridge and the second cartridge; and an one-way clutch coupled to the rotation shaft and configured to allow rotation of the rotation shaft in one direction and limit rotation of the rotation shaft in an opposite direction.

11. The aerosol generating device of claim 1, wherein the one of the first cartridge and the second cartridge is configured to move linearly with respect to the other one of the first cartridge and the second cartridge.

12. The aerosol generating device of claim 11, wherein a plurality of electromagnets are arranged in the one of the first cartridge and the second cartridge along a linear path, and the plurality of electromagnets are configured to reverse polarities sequentially such that the one of the first cartridge and the second cartridge moves along the linear path.

13. The aerosol generating device of claim 12, further comprising a movement limiter configured to limit movement of the one of the first cartridge and the second cartridge to one direction.

14. The aerosol generating device of claim 1, further comprising a solenoid switch configured to limit change of the position of the second cartridge with respect to the first cartridge by contacting the one of the first cartridge and the second cartridge when inactivated, and allow the change of the position of the second cartridge with respect to the first cartridge by releasing contact with the one of the first cartridge and the second cartridge when deactivated.

15. The aerosol generating device of claim 1, further comprising a magnetism sensor configured to detect magnetism of the magnetic body.

16. An aerosol generating device comprising:

a first cartridge configured to accommodate a first material and comprising a delivery hole through which an aerosol generated from the first material is delivered;

a second cartridge comprising a plurality of chambers for accommodating a second material through which the aerosol delivered from the first cartridge passes, and movably coupled to the first cartridge such that a position of the second cartridge with respect to the first cartridge is changeable;

a case configured to accommodate the first cartridge and the second cartridge and maintain a position of one of the first cartridge and the second cartridge;

a magnetic body arranged in one between the case and the other of the first cartridge and the second cartridge; and an electromagnet arranged in the other between the case and the other of the first cartridge and the second cartridge, and configured to generate magnetism toward the magnetic body such that the position of the second cartridge with respect to the first cartridge changes by the magnetism.

* * * * *